US012710827B2

(12) United States Patent
Passaniti et al.

(10) Patent No.: US 12,710,827 B2
(45) Date of Patent: Aug. 18, 2026

(54) SENSING DEVICE FOR GESTURE RECOGNITION AND MOTION TRACKING

(71) Applicant: STMicroelectronics International N.V., Geneva (CH)

(72) Inventors: Fabio Passaniti, Syracuse (IT); Enrico Rosario Alessi, Catania (IT); Salvatore Ferrara, Aci Catena (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 18/980,769

(22) Filed: Dec. 13, 2024

(65) Prior Publication Data

US 2026/0169567 A1 Jun. 18, 2026

(51) Int. Cl.
*G06F 3/01* (2006.01)
*G01C 5/06* (2006.01)

(52) U.S. Cl.
CPC ............... *G06F 3/017* (2013.01); *G01C 5/06* (2013.01)

(58) Field of Classification Search
CPC .................................. G06F 3/017; G01C 5/06
See application file for complete search history.

(56) References Cited

U.S. PATENT DOCUMENTS 5,295,085 A * 3/1994 Hoffacker ................ G01C 5/06 701/8
7,162,368 B2 1/2007 Levi et al.
8,180,591 B2 5/2012 Yuen et al.
8,676,480 B2 3/2014 Lynch et al.
9,383,202 B2 * 7/2016 Zhou ........................ G01C 5/06
9,906,845 B2 2/2018 Alessi
11,644,678 B1 * 5/2023 Castleman .............. G01L 19/14 345/8
12,352,605 B2 * 7/2025 Bonev .................. G01D 3/0365
2006/0100782 A1 5/2006 Levi et al.
2011/0106449 A1 5/2011 Chowdhary et al.
2014/0171068 A1 6/2014 Marti et al.
(Continued)

FOREIGN PATENT DOCUMENTS

CN 103941860 B 5/2017
WO 2015105678 A2 7/2015

OTHER PUBLICATIONS

Peter Shull, Hand Gesture Recognition and Finger Angle Estimation via Wrist-Worn Modified Barometric Pressure Sensing, IEEE Transactions on Neural Systems and Rehabilitation Engineering, vol. 27, No. 4, Apr. 2019 (Year: 2019).*
(Continued)

*Primary Examiner* — Grant Sitta
(74) *Attorney, Agent, or Firm* — Slater Matsil, LLP

(57) ABSTRACT

A method for gesture tracking and motion tracking. The method includes providing a barometric signal via a barometric sensor, processing the barometric signal with a state machine having a plurality of states, the plurality of states comprising stationary states and moving states, transitioning from a first state of the plurality of states of the state machine to a second state of the plurality of states of the state machine as a function of the barometric signal reaching a signal threshold and as a function of a time reaching a time threshold, and determining a movement of the barometric sensor based on the transition from the first state to the second state.

20 Claims, 24 Drawing Sheets

RAISED 460
RISING BACK 480
RISING 440
RESTING 420

(56) References Cited

U.S. PATENT DOCUMENTS

| | | | | |
|---|---|---|---|---|
| 2014/0297217 | A1* | 10/2014 | Yuen | G16H 40/63 702/138 |
| 2015/0198443 | A1* | 7/2015 | Yi | G06V 20/52 702/150 |
| 2015/0226764 | A1* | 8/2015 | Ten Kate | G01C 22/006 702/141 |
| 2015/0247917 | A1 | 9/2015 | Gum et al. | |
| 2015/0286285 | A1* | 10/2015 | Pantelopoulos | G06F 3/048 345/156 |
| 2016/0062364 | A1 | 3/2016 | Foinet et al. | |
| 2016/0102995 | A1* | 4/2016 | Gum | H04W 4/029 702/98 |
| 2017/0289649 | A1* | 10/2017 | Alessi | G08B 5/222 |
| 2019/0041287 | A1 | 2/2019 | Sekitsuka | |
| 2019/0320944 | A1* | 10/2019 | Vaidyanathan | A61B 5/7264 |
| 2020/0319713 | A1* | 10/2020 | Huffman | G06F 3/0346 |
| 2022/0261084 | A1 | 8/2022 | Hong et al. | |
| 2023/0019413 | A1 | 1/2023 | Stern et al. | |
| 2023/0066299 | A1 | 3/2023 | Park et al. | |

OTHER PUBLICATIONS

Vidal, Enriqu et al.: "Probabilistic Finite-State Machines—Part I," IEEE Transactions on Pattern Analysis and Machine Intelligence, IEEE Computer Society, Jul. 1, 2005, pp. 1013-1025, vol. 27, No. 7.

Jung, Pyeong-Gook et al., "A Wearable Gesture Recognition Device for Detecting Muscular Activities Based on Air-Pressure Sensors," IEEE Transactions on Industrial Informatics, vol. 11, No. 2, Apr. 2015, 10 pages.

Komeda, K. et al., "User Activity Recognition Method Based on Atmospheric Pressure Sensing," UBICOMP 14 Adjunct, Sep. 13-17, 2014, 10 pages.

Masse, F., et al., "Improving activity recognition using a wearable barometric pressure sensor in mobility-impaired stroke patients," Journal of NeuroEngineering and Rehabilitation, vol. 12, No. 72, Aug. 25, 2015, 15 pages.

Sankaran, K. et al., "Using Mobile Phone Barometer for Low-Power Transportation Context Detection," 12th ACM Conference on Embedded Networked Sensor Systems (SenSys 2014), Nov. 3-6, 2014, 15 pages.

Shull, Peter B. et al., "Hand Gesture Recognition and Finger Angle Estimation via Wrist-Worn Modified Barometric Pressure Sensing," IEEE Transactions on Neural Systems and Rehabilitation Engineering, vol. 27, No. 4, Apr. 2019, 9 pages.

Vanini, S. et al., "Adaptive Context-Agnostic Floor Transition Detection on Smart Mobile Devices," 2013 IEEE International Conference on Pervasive Computing and Communications Workshops, Mar. 18-22, 2013, 6 pages.

Zhu, Y, et al., "Wrist-worn Hand Gesture Recognition Based on Barometric Pressure Sensing," 2018 IEEE 15th International Conference on Wearable and Implantable Body Sensor Networks, Las Vegas, Nevada, USA, Mar. 4-7, 2018, 4 pages.

* cited by examiner

SENSING DEVICE FOR GESTURE RECOGNITION AND MOTION TRACKING

TECHNICAL FIELD

The present invention relates generally to a system and method for sensing devices, and, in particular embodiments, to a system and method for sensing devices for gesture recognition and motion tracking.

BACKGROUND

Wearable devices, such as smartwatches and fitness trackers, have become increasingly prevalent in recent years. These devices often incorporate various sensors to detect user movements and gestures, enabling intuitive interaction and control. Many wearable devices utilize accelerometers and gyroscopes to detect motion and orientation changes. These sensors can recognize simple gestures like wrist flicks to wake a device's screen or palm-facing motions to dim a display.

Gesture recognition is the process of analyzing and interpreting human gestures through computer algorithms or machine learning models. Gesture recognition generally involves using sensors to capture and track body movements, which is particularly useful for applications in smartwatches and wristbands. These devices are commonly equipped with motion sensors and electromyography (EMG) sensors for detecting hand gestures.

Gesture recognition in smartwatches, other wearables, or handheld devices can enable a wide range of applications and functionalities. Gesture recognition may be used to control music playback with hand motions, answer or reject phone calls with simple gestures, or navigate through notifications and apps without touching the device screen. In fitness-oriented wearables, gesture recognition can be used to automatically detect and log specific exercises or activities. Some smartwatches use gestures for security purposes, such as unlocking the device or authorizing payments. Gesture controls can also enhance accessibility for users with limited mobility or in situations where touch input is impractical, such as while wearing gloves or when the user's hands are occupied. In virtual reality (VR) environments and augmented reality (AR) environments, gesture recognition allows users to interact with virtual objects or navigate virtual spaces using natural hand movements.

SUMMARY

In an embodiment, a method includes: providing a barometric signal via a barometric sensor; processing the barometric signal with a state machine having a plurality of states, the plurality of states include stationary states and moving states; transitioning from a first state of the plurality of states of the state machine to a second state of the plurality of states of the state machine as a function of the barometric signal reaching a signal threshold and as a function of a time reaching a time threshold; and determining a movement of the barometric sensor based on the transition from the first state to the second state.

In an embodiment, a sensing device includes a barometric sensor and a processing unit coupled to the barometric sensor. The processing unit configured as a state machine to receive a barometric signal from the barometric sensor; process the barometric signal with the state machine having a plurality of states, the plurality of states including stationary states and moving states; transition from a first state of the plurality of states of the state machine to a second state of the plurality of states of the state machine as a function of the barometric signal reaching a signal threshold and as a function of a time reaching a time threshold; determine a height and a direction of movement of the barometric sensor in response to transitioning from the first state to the second state; and map the height and the direction of movement to perform gesture recognition on a user interface.

In an embodiment, a method includes: receiving a state machine activation signal; in response to the receiving the state machine activation signal, detecting a change in a barometric signal via a barometric sensor; in response to detecting the change in the barometric signal, entering a first state; determining that a magnitude of the change in the barometric signal is less than a high threshold of a first state; in response to determining that the magnitude of the change in the barometric signal is less than the high threshold of the first state, determining that the magnitude of the change in the barometric signal is greater than a low threshold of the first state; and in response to determining that the magnitude of the change in the barometric signal is greater than the low threshold of the first state, determining an initial height for a second state.

Other embodiments and variations are described herein.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Embodiments of the present invention relate to a sensing device that can determine gesture recognition and motion tracking by utilizing pressure sensors. Various embodiments of the present application disclose a sensing device and a method to determine a height position and directional movement of the sensing device. Various embodiments of the present application disclose a method and system for detecting hand movements and gestures using a barometric signal from a pressure sensor using a state machine with multiple states, including stationary states and moving states, where state transitions occur based on the barometric signal reaching signal thresholds and time reaching time thresholds.

To improve gesture recognition, pressure sensors can be used to detect altitude changes from vertical motion and determine a change in height based on the altitude changes. In other words, pressure sensors can be utilized for motion tracking. Barometric pressure decreases as altitude increases due to the reduced air pressure at higher altitudes. By applying this concept to motion tracking, it is possible to detect the relative height of the wrist or hand with high precision. This approach offers the potential to enhance gesture recognition algorithms and improve the effectiveness of interaction with objects in virtual reality environments.

Embodiments of the application can improve gesture tracking by incorporating detection of changes in a user's hand height and tracking the upward and downward hand movements. The use of a barometric pressure sensor for hand gesture recognition provides a simple and low-power solution for gesture tracking and user interface interaction. The high sensitivity and accuracy of the pressure sensor allows for precise detection of subtle hand movements and height changes. Additionally, the state machine approach with multiple states enables robust gesture recognition by considering both signal variations and timing, allowing for more effective interaction with objects in virtual environments.

Figure 1:
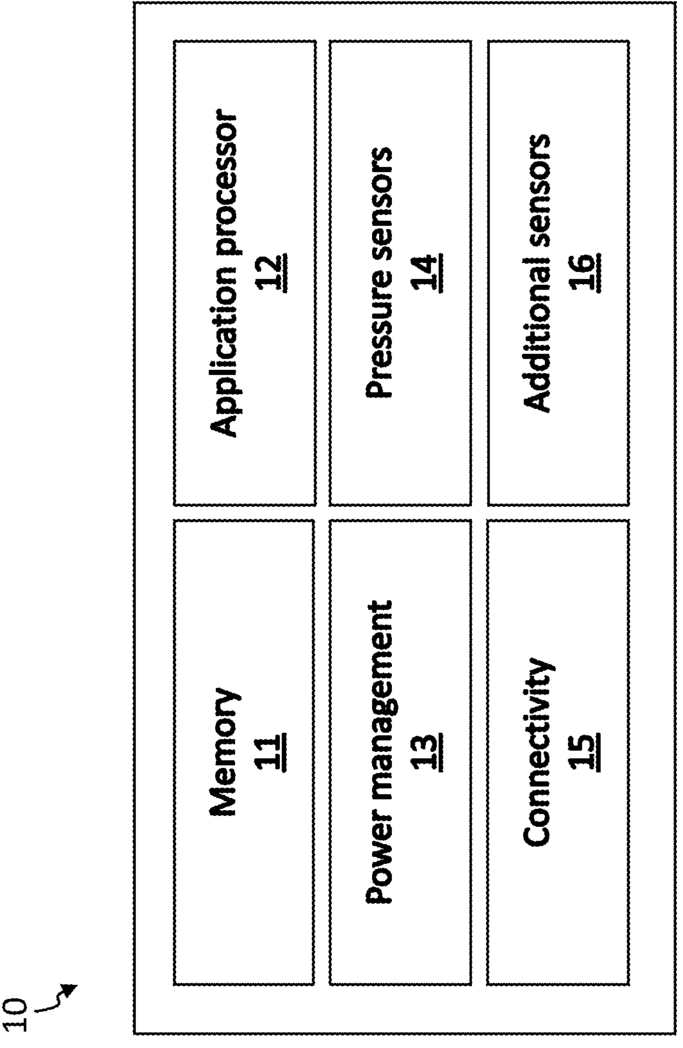
FIG. 1 illustrates a block diagram of a sensing device according to an embodiment of the present application.

FIG. 1 illustrates a block diagram of a sensing device according to an embodiment of the present application. The sensing device 10 may include multiple components integrated into a single system, e.g., a system on a chip or multiple chips on a circuit board, for processing barometric signals to detect movements, motion tracking, and gesture recognition. The sensing device 10 may include a memory 11, an application processor 12, a power management component 13, pressure sensors 14, connectivity component 15, and additional sensors 16.

The memory 11 may be configured to store data and instructions for the sensing device 10 and may comprise various programs to be executed by the application processor 12. The memory 11 may include a non-transitory computer readable medium that stores instructions for execution by the application processor 12. The memory 11 may store one or more state machines, as described below in various embodiments, to be executed by the application processor 12. The memory 11 may comprise both volatile and non-volatile components to support temporary data storage during processing and long-term storage of system software and calibration data. The volatile memory, typically RAM, provides fast access for temporary storage of sensor data, intermediate results, and current state information for a gesture recognition system. The non-volatile memory, such as Flash or EEPROM, can store information such as the device's firmware, gesture recognition algorithms, and sensor calibration data.

In various embodiments, the application processor 12, e.g., a system on a chip, and may comprise a processor, interface, circuitry, and/or the like configured to direct the flow of input and output data for the sensing device 10. The application processor 12 may be coupled to the pressure sensors 14 and the additional sensors 16. The application processor 12 may be configured to receive inputs or event data from the pressure sensors 14 and the additional sensors 16 and interpret the input or event data based on a user interface or application. The application processor 12 may be configured to execute the gesture recognition algorithms and manage system operations. In various embodiments, the application processor 12 may be a microcontroller for simpler implementations or a more powerful CPU for complex applications, depending on the computational requirements. As discussed below, the processor or processing unit can implement a state machine with multiple states, including stationary states and moving states. It is configured to process the barometric signal, manage state transitions based on signal and time thresholds, and detect changes in the barometric signals (i.e., altitude changes) corresponding to the movements.

The power management component 13 is configured to store, distribute, and regulate power to the other components of the sensing device 10. The power management component 13 may implement power-saving techniques and multiple power modes to optimize energy consumption. In embodiments, this component can be implemented on the system on a chip.

The pressure sensors 14 may include one or more barometric pressure sensors, such as an ultra-low power and high-performance sensor, e.g., an ultracompact, piezoresistive, absolute pressure sensor. In various embodiments, the pressure sensors 14 detect subtle changes in air pressure that can correspond to a user's hand height and motions. The pressure sensors 14 can provide a barometric signal that is processed by the application processor 12 to determine changes in the barometric signal that correspond to a height of the pressure sensor 14. The pressure sensors 14 may also be used to estimate pressure profiles as tendons and muscles change with various hand gestures, such as finger flexion/extension. The pressure sensors 14 may be used to detect muscular activity by measuring a change of the air pressure in an air-bladder contacting the interested muscles.

The connectivity component 15 is configured to allow the sensing device 10 to communicate with other devices or systems. The connectivity component 15 may include wireless technologies, such as Bluetooth or Wi-Fi, that enable the device to transmit processed gesture data to a smartphone, computer, or other external systems. The connectivity component 15 may also be configured to support firmware updates and remote configuration on the sensing device 10. This component may also be integrated on the system on a chip.

Additional sensors 16 may be incorporated to complement the pressure sensors and enhance the overall gesture recognition capabilities. The additional sensors 16 may include accelerometers, gyroscopes, electromyography (EMG) sensors or other sensors that provide additional context for interpreting gestures and motion. The data from the additional sensors 16 may be combined with the data from the pressure sensors 14 to improve the accuracy of gesture recognition.

In operation, the sensing device 10 processes the barometric signal from the pressure sensors 14 using the state machine implemented in the application processor 12. The state machine transitions between states based on the barometric signal reaching signal thresholds and time reaching time thresholds. This approach enables the detection of relative hand height changes and tracking of up and down hand movements.

In one or more embodiments, the sensing device 10 may detect various hand height or positions and hand movements, including raising the hand from a resting position to a raised position, lowering the hand from a resting position to a lowered position, and returning to the resting position from the raised or lowered positions. The state machine allows for robust gesture recognition by considering both signal variations and timing.

In various embodiments, the sensing device 10 can utilize the changes in altitude to determine a relative hand height to map movements to a user interface. The sensing device 10 may be useful for applications in virtual and augmented reality environments, where precise tracking of hand movements can enhance user experience and interaction.

Figure 2:
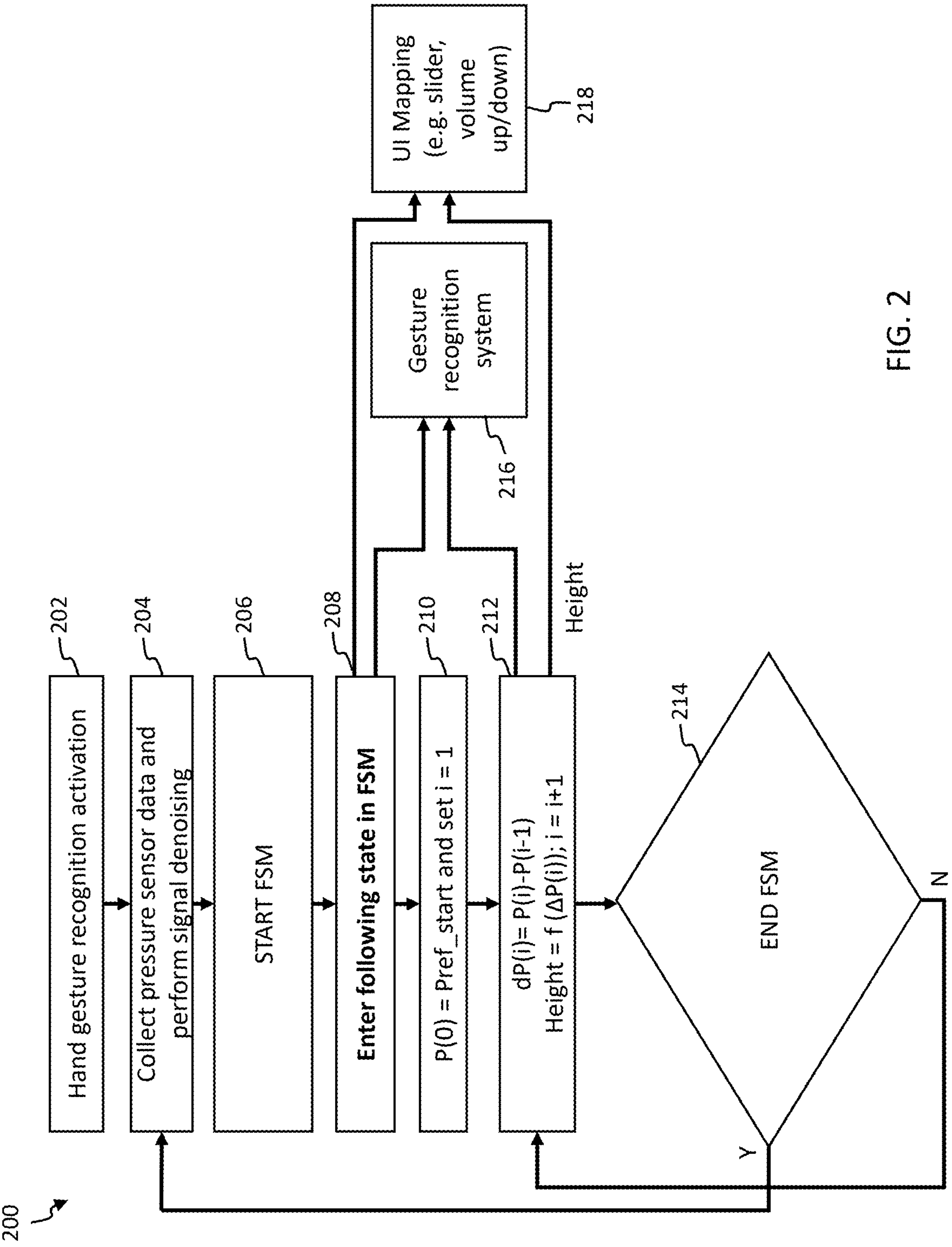
FIG. 2 illustrates a flowchart for gesture recognition according to an embodiment of the present application.

FIG. 2 illustrates a flowchart for gesture recognition according to an embodiment of the present application. The flowchart depicts a process 200 for gesture recognition in a sensing device. FIG. 2 will be described in conjunction with elements of FIG. 1.

The process begins with hand gesture recognition activation in step 202. The activation may be determined by various user actions or system events based on the specific implementation of the sensing device 10. The hand gesture recognition activation in step 202 may send a state machine activation signal to initiate a gesture recognition system that prepares the device to receive and process input from the pressure sensor 14 and the additional sensors 16.

In one or more embodiments, hand gesture recognition activation may be incorporated to reduce power consumption from the sensing device 10 when the hand gesture recognition function is not being utilized. When the hand gesture recognition function is activated, the pressure sensors 14 can begin to collect pressure data, such as raw barometric pressure data or a barometric signal that represents atmospheric pressure.

The hand gesture recognition may active when a user performs a start action, for example, wrist tilting, voice commands, muscle contractions, or other predefined user inputs. For example, the user may activate the gesture recognition system by performing a specific wrist movement, such as a quick rotation or a series of rotations. The additional sensors 16, such as an accelerometer or gyroscope, may detect the characteristic motion pattern associated with the activation gesture. Wrist tilting offers a natural and intuitive way to engage the system, particularly in wearable device applications like smartwatches or fitness trackers.

In one or more embodiments, voice commands may be used to activate the hand gesture recognition function. By incorporating voice recognition capabilities, the system allows users to activate gesture recognition through predefined verbal cues. The voice command may be a specific wake word or phrase, such as "start gesture control" or "enable hand tracking," for example. Voice activation may be useful in hands-free scenarios or when the user's hands are occupied with other tasks.

In one or more embodiments, muscle contractions may be used to activate the hand gesture recognition function. Electromyography (EMG) sensors may detect specific muscle contraction patterns in a user's forearm or hand, such as clenching the fist.

Other user actions that may start the finite state machine include touch gestures on a screen of the sensing device or button presses on the sensing device or a connected peripheral, proximity sensing when the user's hand approaches the device. The various user actions allow the hand gesture recognition system to be integrated into a wide range of devices and applications. For example, the sensing device may be suitable for various platforms such as a standalone wearable device, a smartwatch, or a handheld device.

Following step 202, the process continues to step 204 to collect the raw pressure data and perform signal denoising on the raw pressure sensors data. During signal denoising, the noise and fluctuations from the raw pressure data can be filtered out to provide reliable data for subsequent processing. The signal denoising process enhances the accuracy of gesture detection by reducing the impact of environmental factors and sensor imperfections. The signal denoising process will be described further in FIG. 3.

In various embodiments, the pressure data or barometric signal from the pressure sensors 14 may be sampled at 100 Hz or 100 samples per second. The sampling rate of the barometric signal may be configured based on a particular scenario or use case related to an application or user interface. For example, an application that requires less precision or speed may have a lower sampling rate and an application that requires more precision or speed may have a higher sampling rate. The sampling rate can be, for example, between 10 Hz and 200 Hz.

Following step 204, the process continues to step 206 to start a finite state machine (FSM) or state machine using the pressure data. In one or more embodiments, the raw pressure data or denoised pressure data can be utilized to determine the states in the state machine. In various embodiments, starting the FSM in step 206 transitions the sensing device 10 from a passive monitoring state to active gesture detection state.

After the FSM starts in step 206, the process continues to enter a starting state of the FSM in step 208. In one or more embodiments, the starting state of the FSM may be a following state. In the following state, the application processor 12 monitors changes in the pressure data and analyzes the pressure data or denoised pressure data using the FSM.

In one or more embodiments, the FSM begins at the following state and transitions to other states based on the pressure data and predefined time thresholds. When the FSM transitions between the following state to the other states, the current state of the state machine may be used in a gesture recognition system 216 or for user interface (UI) mapping 218.

After the state machine enters the following state in step 208, the process continues to step 210 to set a reference pressure P(0) and counter i to 1 (i.e., P(0)=Pref_start and i=1, wherein Pref_start is a starting reference pressure). In one or more embodiments, the reference pressure P(0) is an initial pressure data point that can be used to determine an initial height relative to the user. In one or more embodiments, the reference pressure P(0) may be stored in memory 11 to be recalled to compare against subsequent pressure data to determine a change in height relative to the user. In one or more embodiments, the counter i can increment for each subsequent event or each pressure data sample collected.

Following step 210, the process continues to step 212 to calculate a derivative pressure data dP(i) between pressure data points. The pressure data points used to determine dP(i) may be consecutive data points or a first data point and a second data point that is delayed by some amount of time. In various embodiments, dP(i) may be a rate of change in pressure between a current pressure data point P(i) and a previous pressure data point P(i−1). For example, the calculated derivative pressure data may be dP(i)=P(i)−P(i−1).

In one or more embodiments, a calculated difference ΔP(i) can be used to determine a relative height of the sensing device 10. In one or more embodiments, the calculated difference ΔP(i) may be a difference between pressure data at two stationary points. For example, the calculated difference ΔP(i) may be a difference between a current pressure data point P(i) that represents a current stationary height and a previous pressure data point P(i−1) that represents a stationary height of the previous pressure data point. In one or more embodiments, the relative height of the sensing device is a height of the user's wrist that is relative to the initial height determined from the reference pressure P(0). The relative height of the sensing device 10 can be determined based on a function of the calculated difference ΔP(i). For example, the relative height may be Height=f(ΔP(i)). The counter i can be incremented with each iteration (i=i+1), allowing the system to track a change of height over time. The calculated difference ΔP(i) and the relative height determined in step 212 can be utilized in the gesture recognition system in step 216 and/or mapped to a user interface in step 218.

In step 216, the gesture recognition system can interpret the current state of the state machine determined in step 208 and the relative height determined in step 212 to determine specific gestures. In various embodiments, the gesture recognition system 216 may determine specific gestures based on the current state and relative height along with data from the additional sensors 16.

In step 218, the UI mapping can utilize the current state of the state machine determined in step 208 and the relative height determined in step 212 to interact with a user interface. In various embodiments, the relative height can be used to control inputs on a user interface of a corresponding device. For example, the user interface may show a vertical slider that can adjust a volume up or down based on the relative height changes of the sensing device 10. When the relative height increases, the vertical slider may move up on the user interface and a volume of the corresponding device may increase in response to the relative height increase.

The process 200 continues (214=N) to calculate dP(i) and the relative height based on current pressure data in step 212 until the user performs an end action (214=Y) to end the FSM in step 214. In various embodiments, the end actions may include wrist tilting, voice commands, muscle contractions, or other predefined user input. The user action to stop the FSM may be the same action used to start the FSM in step 206 or different action from the action used to start the FSM. If the end action is not performed, the process continues to loop through step 212 to continue calculating dP(i) and the relative height. When the end action is performed, the process returns to step 204 to collect pressure data and perform signal denoising.

Figure 3:
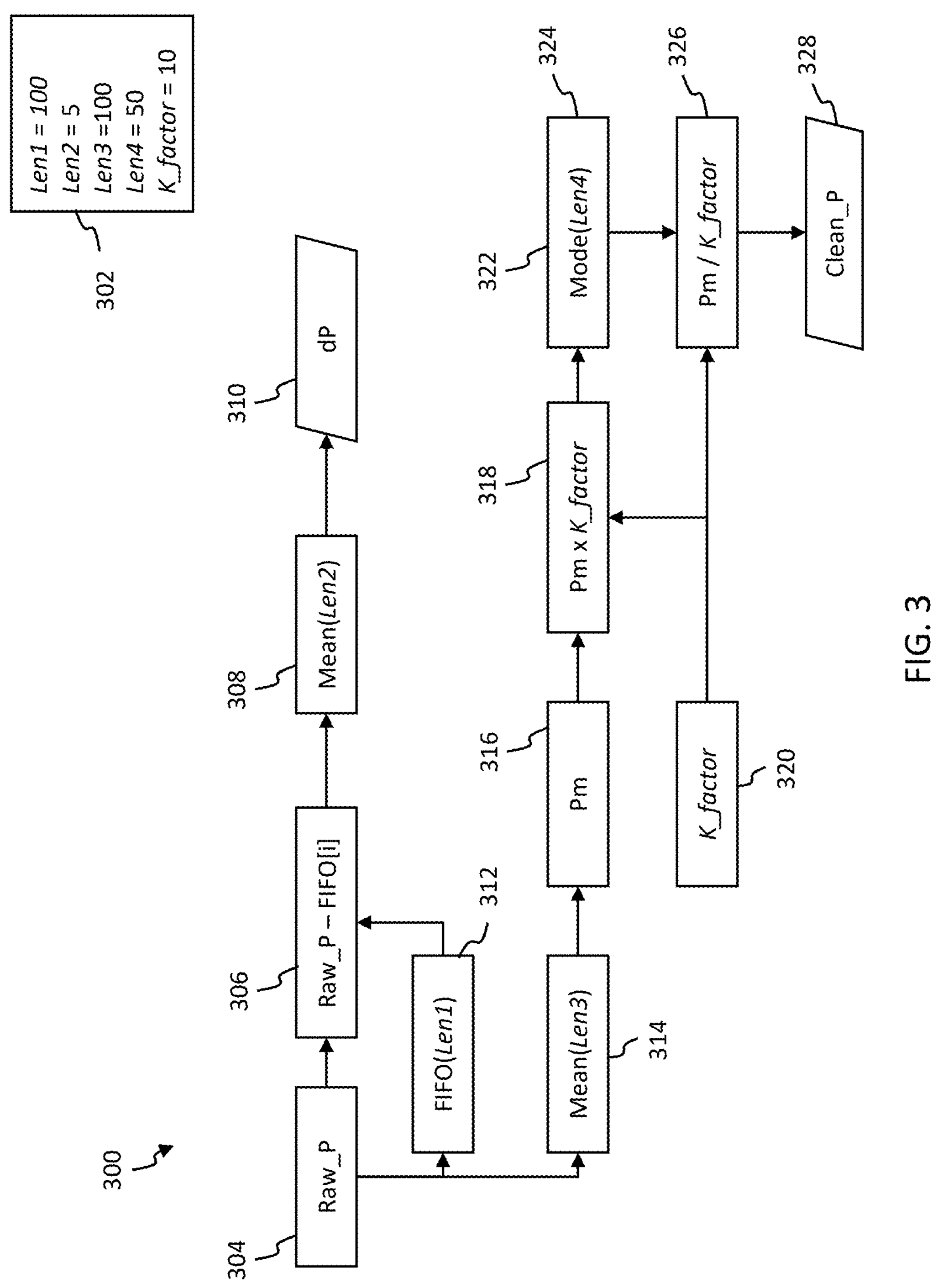
FIG. 3 illustrates a block diagram of a signal denoising process according to an embodiment of the present application.

FIG. 3 illustrates a block diagram of a signal denoising process according to an embodiment of the present application. During signal denoising, the noise and fluctuations from the pressure sensor readings are filtered out to provide reliable data for subsequent processing.

The signal denoising process 300 begins with the raw pressure data (Raw_P) 304, which represents the unprocessed data from the pressure sensor. The raw pressure data (Raw_P) 304 may include both the relevant pressure changes caused by hand movements and unwanted noise from various sources. The raw pressure data (Raw_P) 304 can be used to determine a derivative pressure data (dP) 310 of the raw pressure data with respect to a number of data samples and a clean pressure data (Clean_P) 328.

In one or more embodiments, the derivative pressure data (dP) 310 can be determined based on the raw pressure data (Raw_P) 304, a First-In-First-Out buffer (FIFO(Len1)) 312 for a predetermined number of samples, and a mean or average for a number of samples 308 (Mean(Len2)). The process 300 determines a difference 306 between the raw pressure data (Raw_P) 304 and the first-in-first-out value (FIFO[i]). In various embodiments, the FIFO value represents previous values sampled during a predetermined time. For example, FIFO(Len1) 312 may represents the values for 100 samples (Len1=100) from 1 second prior. The output of the difference 306 between the raw pressure data (Raw_P) and the first-in-first-out value (FIFO[i]) is then used to calculate a mean for a predetermined number of samples.

The mean 308 (Mean(Len2)) can be determined based on an average of the difference 306 between the raw pressure data (Raw_P) and the first-in-first-out (FIFO[i]) for the predetermined number of samples (Len2). For example, the mean (Mean(Len2)) 308 may be determined based on 5 samples (Len2=5) from the difference 306. The output from the mean 308 is then used to calculate the derivative pressure data (dP) 310. The derivative pressure data (dP) 310 represents a rate of change in pressure with respect to the number of data samples.

In one or more embodiments, the raw pressure data (Raw_P) 304 can be used to determine the clean pressure data (Clean_P) 328 simultaneously with determining the derivative pressure data (dP) 310. The clean pressure data (Clean_P) 328 represents a more stable pressure reading compared to the raw pressure data (Raw_P) 304.

The raw pressure data (Raw_P) 304 is filtered through a mean 314 (Mean(Len3)) calculation to calculate an average of a last predetermined number of samples (Len3). For example, the mean 314 (Mean(Len3)) calculation may be determined based on the last 100 samples (Len3=100) of the raw pressure data (Raw_P) 304. The output from the mean 314 is then used to calculate the pressure data (Pm) 316. The pressure data (Pm) 316 represents an average of the raw pressure data (Raw_P) 304 for the predetermined number of samples (Len3). The pressure data (Pm) 316 is then multiplied by a scaling factor (K_factor=10) 320 to amplify the output (Pm×K_factor) 318 from the mean calculation 316. The resulting scaled mean pressure data (Pm×K_factor) 318 filters through a mode calculation 322 with a predetermined number of samples (Len4).

The mode calculation 322 determines the most frequently occurring value in the predetermined number of samples (Len4) in the scaled mean pressure data (Pm×K_factor) 318 to further stabilizes the pressure data and reject outlier values. The output of the mode calculation is then divided by the K_factor to rescale the pressure data back to its original range. The rescaled output 326 determines the clean pressure data (Clean_P) 328. The clean pressure data (Clean_P) 328 represents the denoised pressure signal of the original raw pressure data with various sources of noise and instability removed or reduced.

The various sampling parameters 302 (Len1, Len2, Len3, Len4) and the scaling factor (K_factor) can be tuned to optimize the denoising process for different operating conditions and sensor characteristics. The signal denoising process provides a cleaner, more reliable pressure signal for subsequent stages of gesture analysis and recognition. By reducing noise and stabilizing the pressure data, the system can detect and interpret subtle hand movements and improve gesture recognition.

Figure 4A:
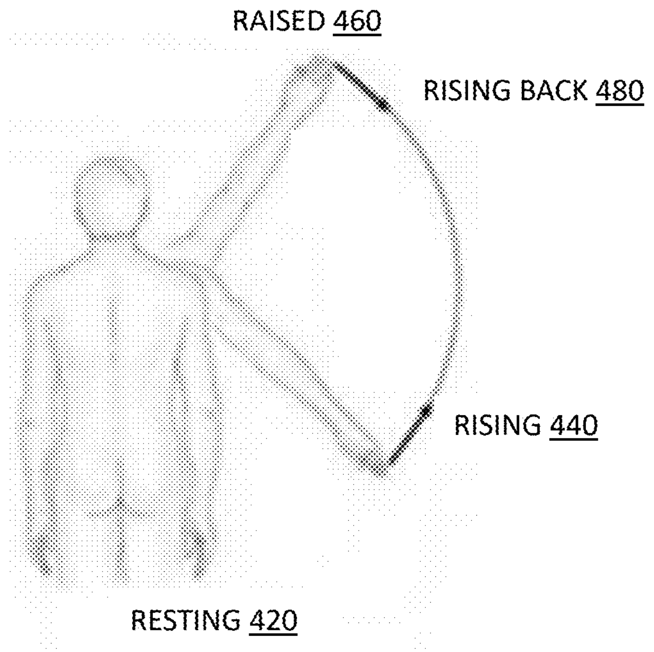
FIGS. 4A and 4B illustrate diagrams for a state machine of a sensing device according to an embodiment of the present application.
Figure 4B:
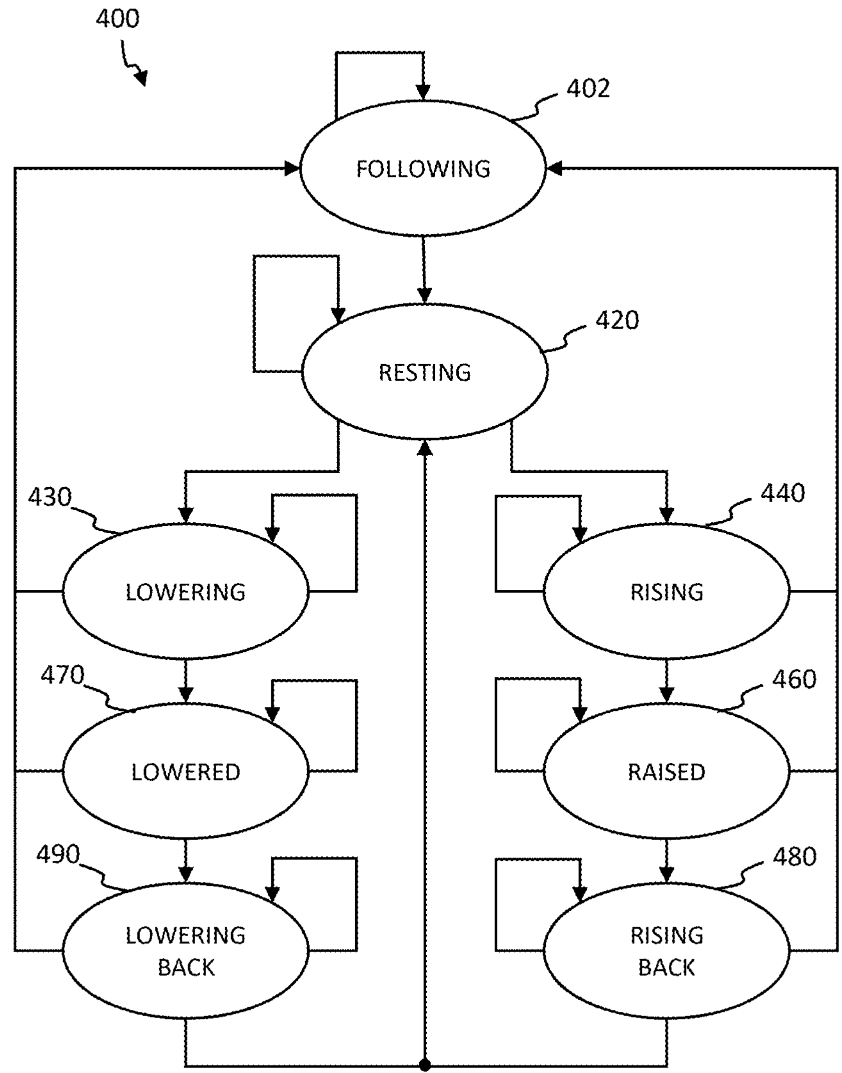

FIGS. 4A and 4B illustrate diagrams for a state machine of a sensing device according to an embodiment of the present application. FIG. 4A illustrates a diagram of a user and the user's relative hand positions corresponding to a state of the state machine. FIG. 4B illustrates a diagram of the state machine 400 that shows the various states and transitions for hand gesture recognition and motion tracking.

Referring to FIG. 4A, the position or relative height of the sensing device may be based on a height relative to the user wearing the sensing device on the user's wrist. For example, as shown in FIG. 4A, the resting position 420 may be a height where the user's arm is by a side of the user's body, the rising position 440 may be an upward moving position between the resting position 420 and the raised position 460, and the rising back position 480 may be a downward moving position between the raised position 460 and the resting position 420.

Referring to FIG. 4B, the state machine 400 includes eight stationary and moving states. The stationary states include a resting state 420, a raised state 460, and a lowered state 470. The moving states include a following state 402, a rising state 440, a rising back state 480, a lowering state 430, and a lowering back state 490. In various embodiments, the system determines state data when the system transitions from one state to the next state based on the current state, the current pressure data is compared to pressure thresholds, and a duration of time in the current state compared to time thresholds. The pressure and time thresholds may allow the system to differentiate between intentional gestures and minor, unintended hand movements or environmental pressure fluctuations.

In one or more embodiments, the state machine 400 can utilize pressure data to determine when the sensing device is moving in an upward motion, downward motion, or remaining in a steady or stabilized position. The system determines that the sensing device is moving in an upward motion when the pressure data decreases (i.e., the height increases as pressure data decreases). The system determines that the sensing device is moving in a downward motion when the pressure data increases (i.e., the height decrease as pressure data increases). The system can determine that the sensing device is in a steady or stabilized position (i.e., stops moving) when the pressure data remains substantially constant over time.

The state machine begins in the following state 402. In one or more embodiments, the state machine 400 enters the following state 402 after a user performs an action to start the state machine. The following state 402 is an initial state of the state machine 400. In various embodiments, the following state 402 may serve as a calibration state to determine a baseline position for gesture recognition and motion tracking. In the following state 402, the system begins to track the pressure data to determine height changes of the sensing device.

From the following state 402, the system can remain in the following state 402 or transition to the resting state 420. The system remains in the following state 402 until the sensing device is steady or stable for a predetermined duration of time in the following state 402. When the sensing device is steady or stable for a predetermined duration of time, the system transitions to the resting state 420.

The resting state 420 represents a reference position of the sensing device. In one or more embodiments, the reference position of the sensing device may be based on the relative height of the user wearing the sensing device on the wrist. For example, the reference position may be a position or height where the user's arm is by the user's side as shown in FIG. 4A. The resting state 420 provides the reference point for detecting upward or downward motion tracking to transition to a next state.

From the resting state 420, the system can transition to a lowering state 430 or a rising state 440. When the sensing device is moving in a downward motion from the reference position in the resting state 420, the system transitions to the lowering state 430. When the sensing device is moving in an upward motion from the reference position in the resting state 420, the system transitions to the rising state 440.

In one or more embodiments, when the system is in the lowering state 430, the system can remain in the lowering state 430, transition to the lowered state 470, or transition to the following state 402. When the sensing device continues to move in a downward motion for a duration less than a time threshold in the lowering state 430, the system remains in the lowering state 430. The system remains in the lowering state 430 until the sensing device reaches a stabilized height for a predetermined duration of time. When the sensing device becomes steady or stable in the lowering state 430 for the predetermined duration of time, the system transitions to the lowered state 470. The system returns to the following state 402 when the sensing device continues to move in a downward motion for a duration that exceeds a time threshold in the lowering state 430 or when the sensing device moves in an upward motion in the lowering state 430.

In one or more embodiments, when the system is in the lowered state 470, the system can remain in the lowered state 470, transition to the lowering back state 490, or transition to the following state 402. In one or more embodiments, the lowered state 470 may represent a minimum reference position that is based on the stabilized height (e.g., lowered height) of the sensing device in the lowered state 470. When the sensing device is steady or stable for a duration less than a time threshold of the lowered state 470, the system remains in the lowered state 470. When the sensing device moves in an upward motion from the lowered state 470, the system transitions to the lowering back state 490. For example, when the sensing device is moving upwards towards the reference position and away from the minimum reference position, the system transitions from the lowered state 470 to the lowering back state 490. The system returns to the following state 402 when the sensing device is steady or stable for a duration of time that exceeds the time threshold of the lowered state 470. In some embodiments, the system may transition from the lowered state 470 to the lowering state 430 when the sensing device moves in a downward motion from the minimum reference position.

In one or more embodiments, when the system is in the lowering back state 490, the system can remain in the lowering back state 490, transition to the resting state 420, or transition to the following state 402. In the lowering back state 490, the sensing device is moving upwards towards the reference position and away from the minimum reference position. The system remains in the lowering back state 490 when the sensing device continues to move in an upward motion toward the reference position. The system transitions to the resting state 420 from the lowering back state 490 when the sensing device reaches the reference position. When the sensing device moves in a downward motion away from the reference position or remains stable for a predetermined duration of time in the lowering back state 490, the system transitions to the following state 402.

From the resting state 420, the system can transition to the rising state 440 from the resting state 420. When the sensing device increases from the reference position in the resting state 420, the system transitions to the rising state 440 as shown in FIG. 4A. From the rising state 440, the system can remain in the rising state 440, transition to the raised state 460, or transition to the following state 402. When the sensing device continues to move in an upward motion for a duration less than a time threshold in the rising state 440, the system remains in the rising state 440. The system remains in the rising state 440 until the sensing device reaches a steady position for a predetermined duration of time. When the sensing device is steady or stable in the rising state 440 for the predetermined duration of time, the system transitions to the raised state 460. The system returns to the following state 402 when the sensing device continues to move in an upward motion for a duration that exceeds a time threshold in the rising state 440 or when the sensing device moves in a downward motion in the rising state 440.

In one or more embodiments, when the system is in the raised state 460, the system can remain in the raised state 460, transition to the rising back state 480, or transition to the following state 402. In one or more embodiments, the raised state 460 may represent a maximum reference position that is based on the stabilized height (e.g., raised height) of the sensing device in the raised state 460. When the sensing device is steady or stable for a duration less than a time threshold of the raised state 460, the system remains in the raised state 460. When the sensing device moves in a downward motion from the raised state 460, the system transitions to the rising back state 480. For example, when the sensing device is moving downward towards the reference position and away from the maximum reference position, the system transitions from the raised state 460 to the rising back state 480. The system returns to the following state 402 when the sensing device is steady or stable for a duration of time that exceeds the time threshold of the raised state 460. In some embodiments, the system may transition from the raised state 460 to the rising state 440 when the sensing device moves in an upward motion from maximum reference position.

In one or more embodiments, when the system is in the rising back state 480, the system can remain in the rising back state 480, transition to the resting state 420, or transition to the following state 402. In the rising back state 480, the sensing device is moving downward towards the reference position and away from the maximum reference position. The system remains in the rising back state 480 when the sensing device continues to move in a downward motion toward the reference position. The system transitions to the resting state 420 from the rising back state 480 when the sensing device reaches the reference position. When the sensing device moves in an upward motion away from the reference position or remains stable for a predetermined duration of time in the rising back state 480, the system transitions to the following state 402.

In various embodiments, the lowering state 430, the lowered state 470, the lowering back state 490, the rising state 440, the raised state 460, and the rising back state 480 transitions to the following state 402 when the system detects unexpected or prolonged movements that do not match predefined gesture patterns. When the system encounters ambiguous input or when the user terminates a gesture abruptly, the system resets and recalibrates starting at the following state.

The state machine 400 enables the system to determine changes in height from the pressure data to track a direction of the vertical motion. In one or more embodiments, the changes in height and direction of the vertical motion can be utilized for hand gesture recognition or mapped to a user interface to support gesture-based interactions in various applications.

Details of the transitions from the following state 402, the resting state 420, the rising state 440, the raised state 460, and the rising back state 480 are further described below with respect to FIGS. 5-9. A state machine 1000 is provided in FIG. 10 for lowering state 430 (1060 in FIG. 10), lowered state 470 (1070), and lowering back state 490 (1080). The state machine 1000 closely follows the steps for state machine 400.

Figure 5:
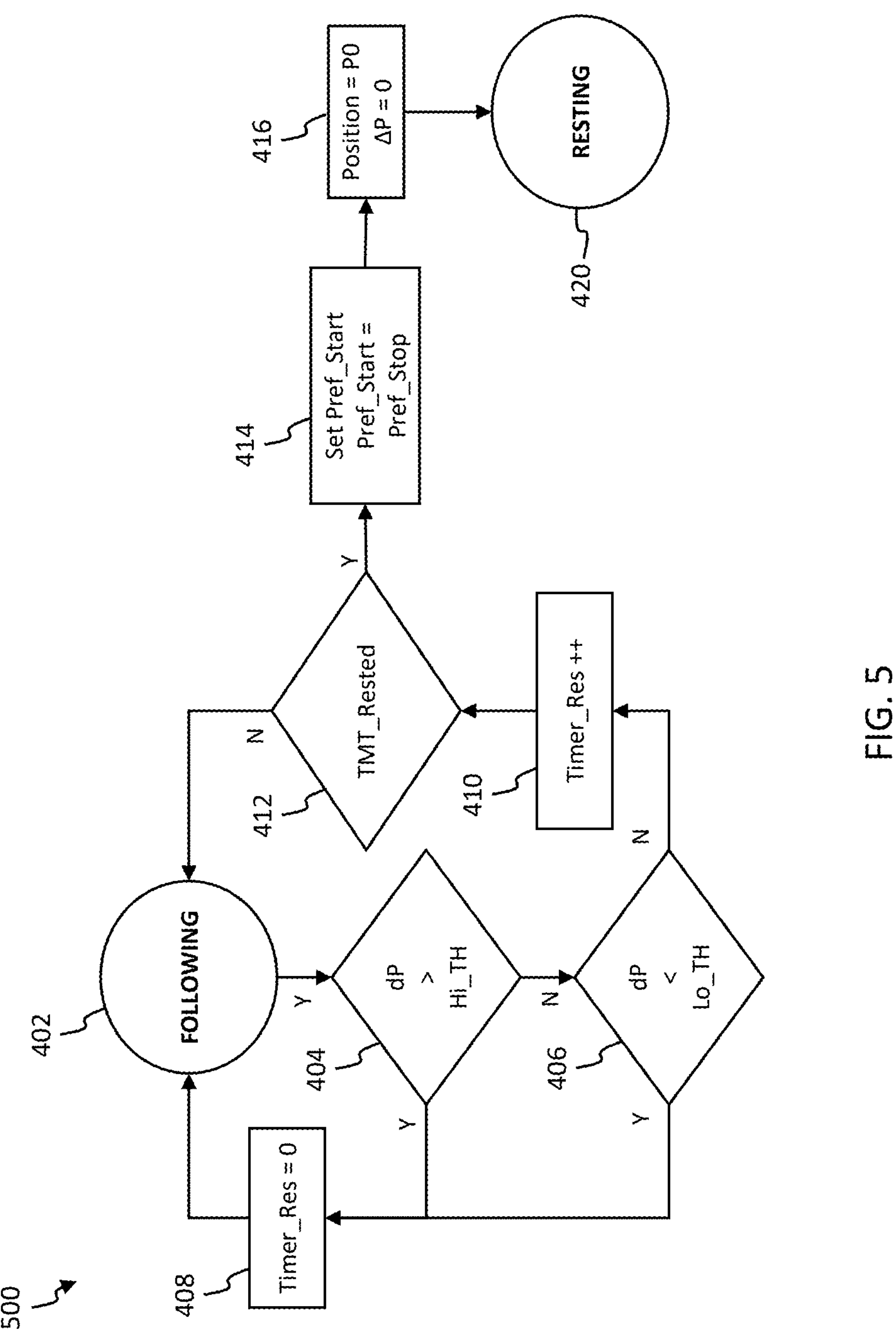
FIGS. 5-9 illustrate flow diagrams for transitions in a state machine according to an embodiment of the present application.

FIG. 5 illustrates a flow diagram 500 for a state machine transition according to an embodiment of the present application. The following state 402 is a starting state for a state machine configured to track vertical motions using barometric pressure sensing that can be used to determine hand gesture recognition. The flow diagram 500 provides a view of the conditions to transition to the next state from the following state 402 in state machine 400.

In one or more embodiments, the following state 402 is the initial state of the state machine 400 after activation. From the following state 402, the system continuously monitors and evaluates the pressure changes by comparing a derivative pressure data (dP) with a high threshold (Hi_TH) for the following state 402 and a low threshold (Lo_TH) of the following state 402. The thresholds of the following state 402 can be used to determine a reference position for tracking the upward movements, downward movements, or steady position of the sensing device.

The high threshold (Hi_TH) and the low threshold (Lo_TH) of the following state 402 may be set to reduce a range of heights for a desired reference position. The high threshold (Hi_TH) of the following state 402 may be set to a pressure variation value that corresponds to a magnitude of change or variations in the pressure that indicates a downward or lowering movement. The low threshold (Lo_TH) for the following state 402 may be set to a pressure variation value that corresponds to a magnitude of change or variations in the pressure that indicates an upward or rising movement.

In various embodiments, the system can evaluate the pressure changes by comparing an absolute pressure value P with a high threshold for absolute pressure (P_Hi_TH) and a low threshold for absolute pressure (P_Lo_TH). The thresholds for absolute pressure may be set to an absolute pressure value P that corresponds to a height position that excludes a range of other height positions. For example, the low threshold for absolute pressure (P_Lo_TH) may be set to a pressure that corresponds to a height position that excludes a range of height positions that are higher than the desired reference position. For example, an application or interface may call for a desired reference position to be at a midpoint position substantially between the highest height position and the lowest height position, the high threshold for absolute pressure (P_Hi_TH) and low threshold for absolute pressure (P_Lo_TH) may be set to narrow down the desired reference position to a height range for the midpoint position.

In decision block 404, the system checks whether the derivative pressure data (dP) is greater than the high threshold (Hi_TH). When derivative pressure data (dP) is greater than the high threshold (Hi_TH) (404=Y), the system sets a rest timer 408 to zero (Timer_Res=0) and returns to the following state 402. When derivative pressure data (dP) is not greater than Hi_TH (404=N), the system proceeds to decision block 406 to checks whether the derivative pressure data (dP) is less than Lo_TH. When derivative pressure data (dP) is less than the low threshold (Lo_TH) (Yes=406), the system sets the rest timer 408 to zero (Timer_Res=0) and returns to the following state 402.

When derivative pressure data (dP) is greater than the low threshold (Lo_TH) (406=Y), the system increments the rest timer 410 (Timer_Res++). The rest timer keeps track of a duration that the pressure data remains stable within the threshold bounds. As the rest timer increments, the system proceeds to check whether the rest timer reaches a predefined rest timeout value (TMT_Rested) 412. The rest timeout value (TMT_Rested) may be set to a duration that determines whether the pressure data is stable. When the pressure data is stable for less than the rest timeout value (TMT_Rested) (412=N), then the system returns to the following state 402 to continue monitoring and evaluating the pressure changes until the pressure data is stable for the duration of the rest timeout value (TMT_Rested).

When the sensing device is stable and the rest timer reaches the rest timeout value (TMT_Rested) (412=Y), the system proceeds to set a starting reference pressure 414 (Set Pref_Start). For example, the starting reference pressure (Pref_Start) may be set equal to a stopping reference pressure (Pref_Stop).

After the starting reference pressure is set, the system initializes a reference position to (P0) and a change in pressure (ΔP) is set to zero (ΔP=0) 416. The reference position (P0) and the change in pressure (ΔP) 416 are initialized to detect the upward or downward motion of the sensing device relative to this reference position (P0). After the reference position (P0) is initialized and ΔP is set to zero, the system transitions to the resting state 420. The resting state 420 determines whether the sensing device is moving in an upward or downward motion.

Figure 6:
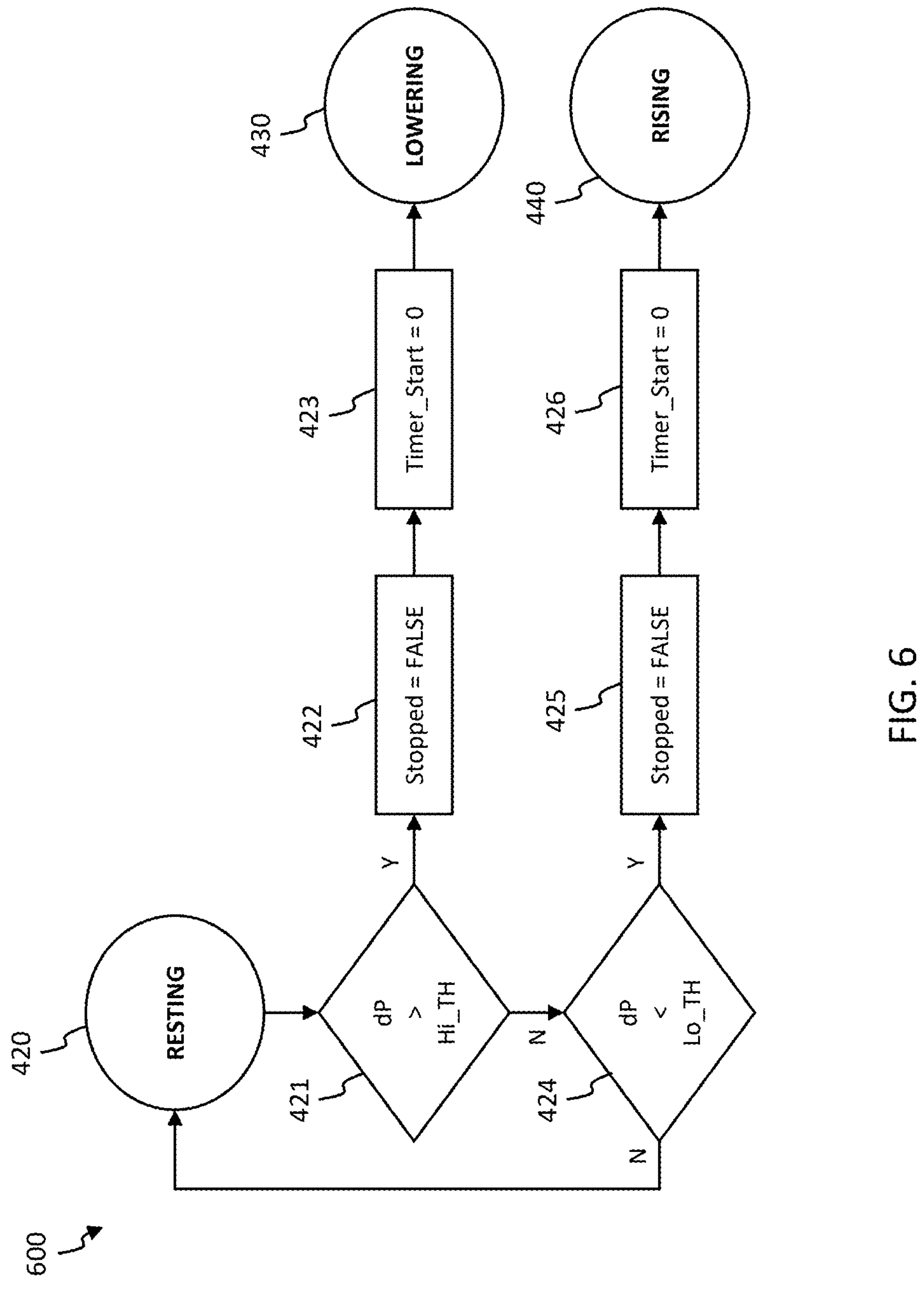

FIG. 6 illustrates a flow diagram 600 for a state machine transition according to an embodiment of the present application. The flow diagram 600 provides a view of the conditions to transition to the lowering state 430 or the rising state 440 from the resting state 420.

In one or more embodiments, the resting state 420 is a state that determines whether the sensing device is moving in an upward or downward motion from a reference position. From the resting state 420, the system evaluates pressure changes by comparing a derivative pressure data (dP) with a high threshold (Hi_TH) of the resting state 420 and a low threshold (Lo_TH) of the resting state 420.

The flow diagram 600 uses the high threshold and the low threshold to determine the direction the sensing device is moving based on a reference position (P0). In various embodiments, the high threshold indicates that the sensing device is moving vertically downwards (i.e., lowering) and the low threshold indicates that the sensing device is moving vertically upward (i.e., rising).

From the resting state 420, the system checks whether the derivative pressure data (dP) is greater than a high threshold (Hi_TH) 421 of the resting state 420. When the derivative pressure data is greater than the high threshold (421=Y) of the resting state 420, the system proceeds to set a "stopped" flag to false (Stopped=FALSE) 422. The "stopped" flag can be used to confirm whether there are significant variations in the derivative pressure data dP for a duration of time. When the "stopped" flag is set to false, there are significant variations in the derivative pressure data dP which indicates the sensing device is moving. When there are no significant variations in the derivative pressure data dP, the system detects that the sensing device is stable or resting (i.e., not moving) and the "stopped" flag is set to true.

The process then sets a start timer to zero (Timer_Start=0) 423. In various embodiments, the start timer can be used to track the duration of a downward motion in the lowering state 430. After the stopped flag and the start timer have been set to false and zero, respectively, the system proceeds to the lowering state 430.

When the derivative pressure data is less than the high threshold (421=N) of the resting state 420, the system proceeds to check whether the derivative pressure data is less than the low threshold of the resting state 424. When the derivative pressure data is less than the low threshold (424=Y) of the resting state 420 the system proceeds to sets the "stopped" flag to false (Stopped=FALSE) 425. The process then sets the start timer to zero (Timer_Start=0) 426. In other embodiments, the start timer can be used to track the duration of an upward motion in the rising state 440. After the stopped flag and the start timer have been set to false and zero, respectively, the system proceeds to the rising state 440.

When the derivative pressure data is greater than the low threshold (424=N) of the resting state 420, the system returns to the resting state 420 to continue determining whether the pressure changes have met the conditions to transition to the lowering state 430 or the rising state 440.

Figure 7:
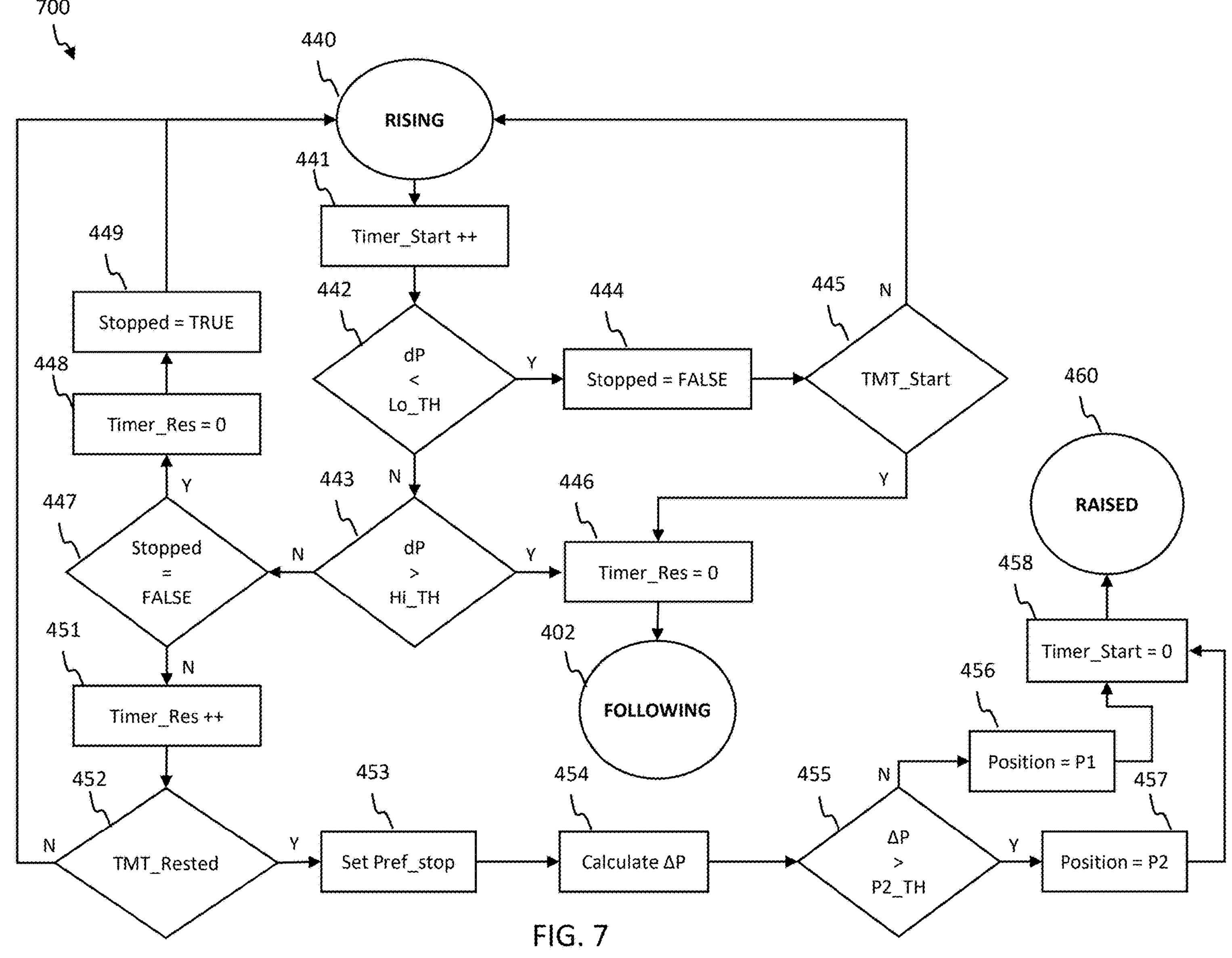

FIG. 7 illustrates a flow diagram 700 for a state machine transition according to an embodiment of the present application. The flow diagram 700 shows a detailed diagram for processing pressure data to detect and classify changes in the barometric signal while in the rising state 440 of the state machine 400.

In one or more embodiments, the rising state 440 is a state that represents an upward motion from the resting state 420 of the state machine 400. From the rising state 440, the system evaluates pressure changes by comparing a derivative pressure data (dP) with a high threshold (Hi_TH) of the rising state 440 and a low threshold (Lo_TH) of the rising state 440. The threshold of the rising state 440 can be used to determine when the sensing device is moving vertically upward or downward. For example, when the derivative pressure data is greater than the high threshold of the rising state 440, the sensing device is moving vertically downward. When the derivative pressure data is less than the high threshold of the rising state 440, the sensing device may be continuing to move in an upwards motion or the sensing device may be approaching a raised state 460 when the movement stops for a predefined duration of time.

When the system is in the rising state 440, the start timer increments 441 continuously to track a duration of the motion in the rising state 440. As the start timer increments 441, the system checks whether the derivative pressure data is less than a low threshold 442 of the rising state 440. When the derivative pressure data is less than the low threshold (442=Y) of the rising state 440, the system proceeds to sets a "stopped" flag to false (Stopped=FALSE) 444. After the stopped flag is set to false 444, the system checks whether the start timer reaches a predefined start timeout value (TMT_Start) 445. The start timeout value (TMT_Start) may be set as a time threshold to determine whether the system remains in the current state or returns to the following state. When the start timer does not reach the start timeout value (445=N), the system returns to the rising state 440. When the start timer reaches the start timeout value (445=Y), the system sets the rest timer to zero (Timer_Res=0) 446 and returns to the following state 402.

When the derivative pressure is greater than the low threshold (442=N), the system checks whether the derivative pressure is greater than the high threshold 443. When the derivative pressure is greater than the high threshold (443=Y), the system proceeds to set the rest timer to zero 446 and returns to the following state 402.

When the derivative pressure is less than the high threshold (443=N), the system determines whether the stopped flag is false (Stopped=FALSE) 447. When the stopped flag is false (447=Y), the system sets the rest timer to zero 448, sets the stopped flag is true (Stopped=TRUE) 449, and returns to the rising state 440.

When the stopped flag is not false (447=N), the system increments the rest timer 451 and checks whether the rest timer reaches the rest timeout value (TMT_Rested) 452. If the rest timer does not reach the rest timeout value (TMT_Rested) (452=N), the system returns to the rising state 440 to continue tracking the motion of the sensing device. If the rest timer reaches the rest timeout value (TMT_Rested) (452=Y), the system proceeds to set a stopping reference pressure (Pref_stop) 453. The stopping reference pressure (Pref_stop) represents the pressure data collected when the rising motion stops or remained steady. Using the stopping reference pressure and the starting reference pressure, the system calculates a change in pressure (ΔP) 454 and determines whether the change in pressure (ΔP) is greater than a pressure threshold (P2_TH) 455.

When the change in pressure (ΔP) is greater than the pressure threshold (455=Y), the system proceeds to set the position P equal to P2 (Position=P2) 457, where P2 is a position that corresponds to a maximum height of the sensing device. When the change in pressure ΔP is less than the pressure threshold (455=N), the system proceeds to set the position P equal to P1 (Position=P1) 456, where P1 is a position between P0 in the following state 402 and P2 the maximum height. In some embodiments, the position P is set as a raised position for the raised state 460. After the position P is set, the system proceeds to reset the start timer to zero 458, and transitions the state diagram from the rising state 440 to the raised state 460.

The flow diagram 700 uses the thresholds and timers to determine whether the sensing device is continuing in an upward motion or whether the upward motion stops to transition the state machine to the raised state 460. When the system does not meet the set thresholds or the timers do not reach the timeout values, the system remains in the rising state 440 to continue to check whether the sensing device reaches the set criteria or returns to the following state 402 to restart the process.

Figure 8:
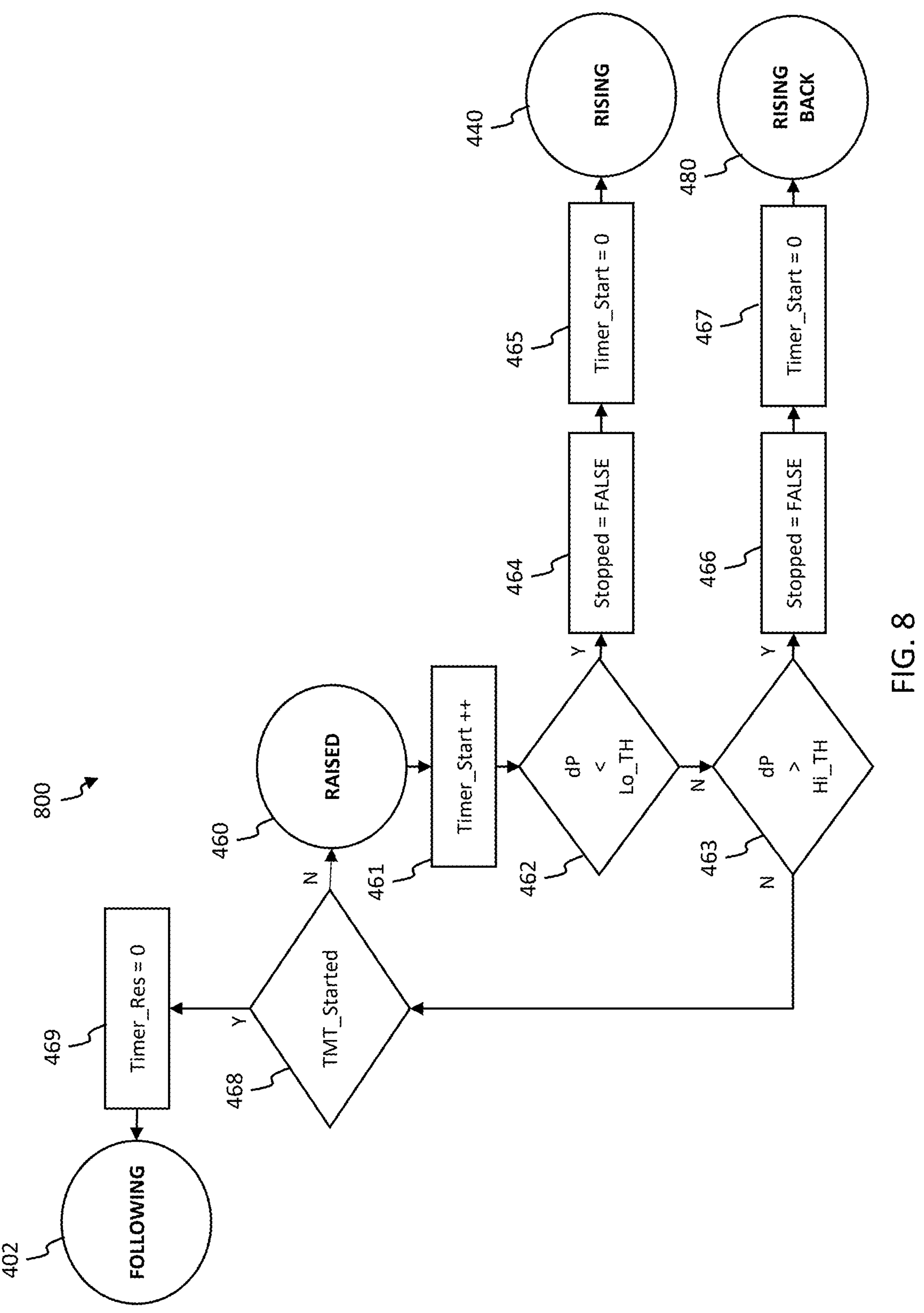

FIG. 8 illustrates a flow diagram 800 for a state machine transition according to an embodiment of the present application. The flow diagram 800 shows a detailed diagram for processing pressure data to detect and classify changes in the barometric signal while in the raised state 460 of the state machine 400.

In one or more embodiments, the raised state 460 is a state that represents a raised position relative to the reference position after an upward motion is completed. From the raised state 460, the system evaluates pressure changes by comparing a derivative pressure data (dP) with a high threshold (Hi_TH) of the raised state 460 and a low threshold (Lo_TH) of the raised state 460. The threshold of the raised state 460 can be used to determine when the sensing device is moving vertically upward or downward from the raised position.

For example, when the derivative pressure data (dP) is less than the low threshold of the raised state 460, the sensing device is moving vertically upwards (i.e., rising). When the derivative pressure data is higher than the high threshold of the raised state 460, the sensing device is moving vertically downwards (i.e., rising back).

In various embodiments, when the derivative pressure data is greater than the low threshold and less than the high threshold, the sensing device may be in a stable raised position for a predefined duration of time. If the sensing device is in a stable raised position for more than the predefined duration of time, the system may return to the following state 402 to determine a new reference position (P0).

When the system is in the raised state 460, a start timer increments 461 continuously to track a duration of a raised position in the raised state 460. After the start timer increments 461, the system determines whether the derivative pressure data (dP) is less than a low threshold (Lo_TH) 462 of the raised state 460. When the derivative pressure data is less than the low threshold (462=Y) of the raised state 460, the system proceeds to sets a "stopped" flag to false (Stopped=FALSE) 464 and sets the start timer value to zero 465. After the stopped flag is set to false and the start timer is set to zero, the system proceeds to the rising state 440.

When the derivative pressure data is greater than the low threshold (462=N) of the raised state 460, the system proceeds to determine whether the derivative pressure data (dP) is greater than a high threshold (Hi_TH) 463 of the raised state 460. When the derivative pressure data is greater than the high threshold (463=Y) of the raised state 460, the system proceeds to set a "stopped" flag to false (Stopped=FALSE) 466 and sets the start timer value to zero 467. After the stopped flag is set to "FALSE" and the start timer is set to zero, the system proceeds to the rising back state 480.

When the derivative pressure data is less than the high threshold (463=N) of the raised state 460, the system determines whether the start timer reaches a started timeout value (TMT_Started) 468. The started timeout value (TMT_Started) may be set as a time threshold to determine when ta new resting position is detected. If the start timer does not reach the started timeout value (468=N), the system returns to the raised state 460 to continue evaluating the derivative pressure data compared to the thresholds. If the start timer reaches the started timeout value (468=Y), the system sets the rest timer to zero 469 and returns to the following state 402.

The flow diagram 800 uses the high threshold and the low threshold to determine the direction the sensing device is moving relative to the raised position (P=P1 or P2). For example, the flow diagram 800 may transition the state machine to the next state based on the sensing device maintaining a raised position (e.g., raised 460 or following 402), the sensing device continuing to rise from the raised position (e.g., rising 440), or the sensing device is moving downwards from the raised position (e.g., rising back 480).

Figure 9:
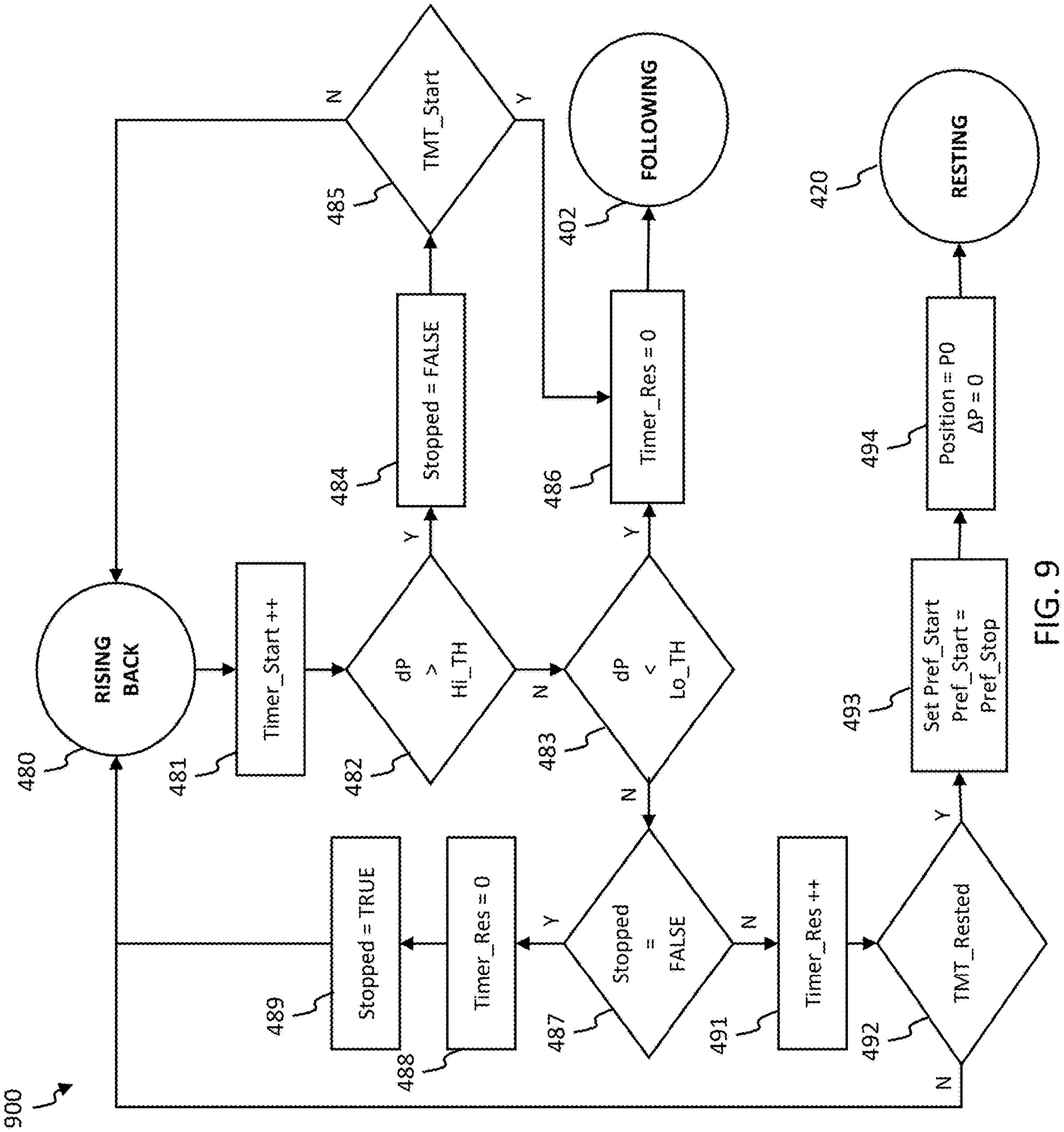

FIG. 9 illustrates a flow diagram 900 for a state machine transition according to an embodiment of the present application. The flow diagram 900 shows a detailed diagram for processing pressure data to detect and classify changes in the barometric signal while in the rising back state 480 of the state machine 400.

In one or more embodiments, the rising back state 480 is a state that represents a downward motion from the raised state 460 of the state machine 400. From raised state 460, the system continuously evaluates pressure by comparing a derivative pressure data (dP) with a high threshold (Hi_TH) of the raised state 460 and a low threshold (Lo_TH) of the raised state 460. The threshold of the raised state 460 can be used to determine when the sensing device returns to the reference position (P0) of the resting state 420. For example, when the derivative pressure data is greater than the high threshold of the rising back state 480 or less than the lower threshold of the rising back state 480, the system may return to the following state 402 to determine a new reference position (P0). When the derivative pressure data is less than the high threshold and greater than the low threshold, the system may return to the resting state 420 to determine whether the sensing device is moving vertically upwards (i.e., rising) or downwards (i.e., lowering) from the original reference position (P0).

When the system is in the rising back state 480, the start timer increments 481 continuously to track a duration of the motion in the rising back state 480. As the start timer increments 481, the system checks whether the derivative pressure data (dP) is greater than a high threshold (Hi_TH) 482 of the rising back state 480. When the derivative pressure data is greater than the high threshold (482=Y) of the rising back state 480, the system proceeds to sets a "stopped" flag to "FALSE" 484. After the stopped flag is set to "FALSE" 484, the system determines whether the start timer reaches a start timeout value (TMT_Start) 485. If the start timer does not reach the start timeout value (485=N), the system returns to the rising back state 480. If the start timer reaches the timeout value (485=Y), the system set the rest timer to zero 486 and returns to the following state 402.

When the derivative pressure data is less than the high threshold (482=N) of the rising back state 480, the system proceeds to determine whether the derivative pressure data (dP) is less than a low threshold (Lo_TH) 483 of the rising back state 480. When the derivative pressure data is less than the low threshold (483=Y) of the rising back state 480, the system proceeds to set the rest timer to zero (Timer_Res=0) 486 and returns to the following state 402.

When the derivative pressure is greater than the low threshold (483=N), the system determines whether the stopped flag is "FALSE" (Stopped=FALSE) 487. If the stopped flag is "FALSE" (487=Y), the system sets the rest timer to zero 448, sets the stopped flag to "TRUE" (Stopped=TRUE) 489, and returns to the rising back state 480.

When the stopped flag is not "FALSE" (487=N), the system increments the rest timer 491 and checks whether the rest timer reaches the rest timeout value (TMT_Rested) 492. If the rest timer does not reach the rest timeout value (TMT_Rested) (492=N), the system returns to the rising back state 480 to continue tracking the motion of the sensing device.

If the rest timer reaches the rest timeout value (TMT_Rested) (492=Y), the system proceeds to set the starting reference pressure (Pref_Start) equal to the stopping reference pressure (Pref_Stop) 493. The starting reference pressure may be a pressure value that corresponds to a new starting height position and the stopping reference pressure may be a pressure value that corresponds to a new stopping height position. In some embodiments, the new starting height position and the new stopping height position may be different from the starting reference pressure and stopping reference pressure set in the following state 402 shown in FIG. 5. When the starting reference pressure is set equal to the stopping reference pressure, the change in pressure ($\Delta P$) is equal to zero. Using the starting reference pressure and the stopping reference pressure, the system resets the reference position to P0 and the change in pressure ($\Delta P$) is set to zero ($\Delta P=0$) 494. The reference position (P0) and the change in pressure ($\Delta P$) 494 are reset and the system transitions to the resting state 420.

The flow diagram 900 uses multiple thresholds and timers to determine whether the sensing device is continuing in a downward motion toward the reference position (P0) or whether the downward motion stops to transition the state machine to the resting state 420. When the system does not meet the set thresholds or the timer does not reach the timeout values, the system remains in the rising back state 480 to continue to check whether the sensing device reaches the set criteria or returns to the following state 402 to restart the process.

Figure 10:
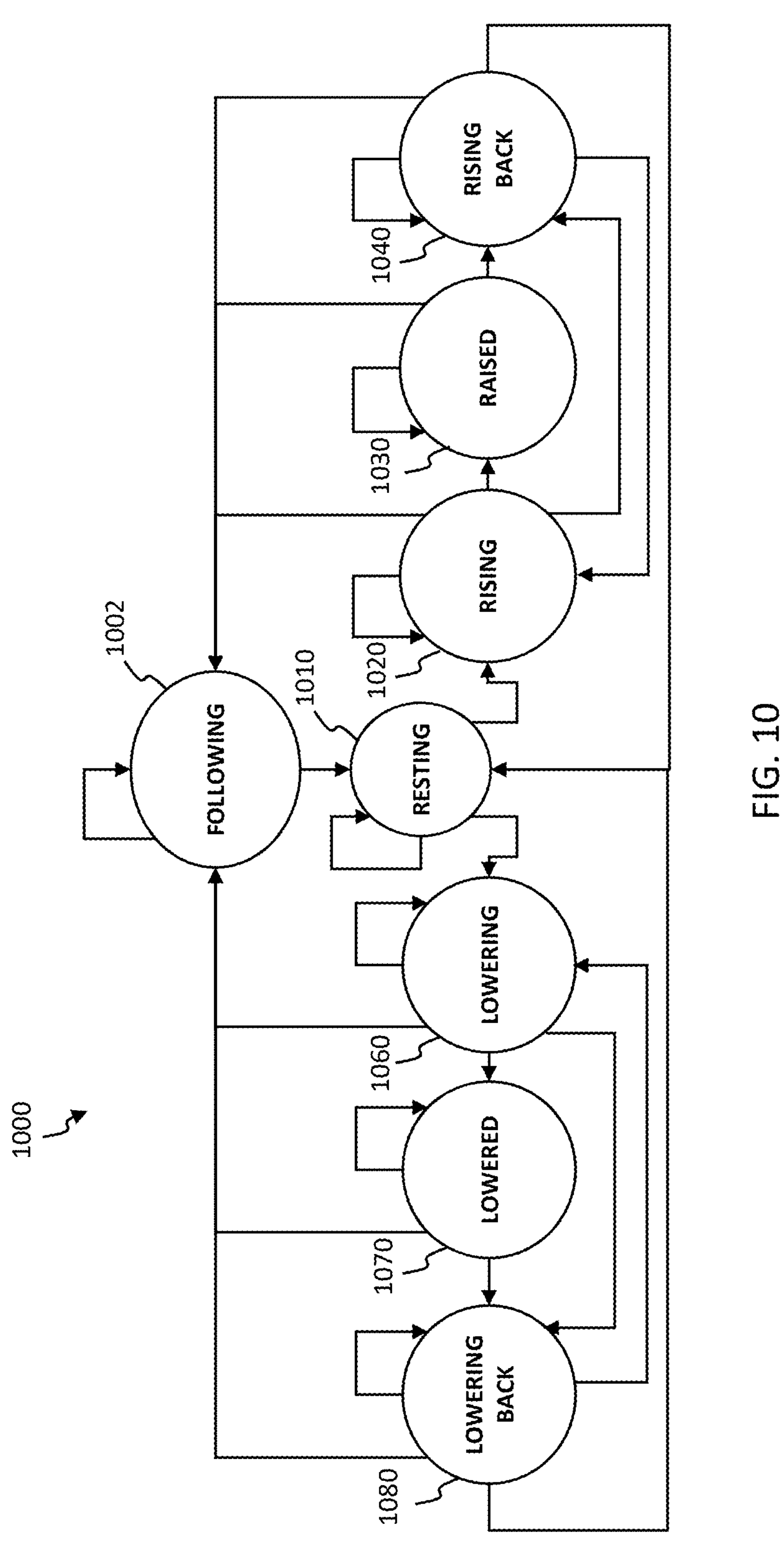
FIG. 10 illustrates a diagram of a state machine for a sensing device according to an embodiment of the present application.

FIG. 10 illustrates a diagram of a state machine for a sensing device according to an embodiment of the present application. The state machine 1000 shows the various states and transitions for gesture recognition and motion tracking.

The state machine 1000 includes eight stationary and moving states. The stationary states include a resting state 1010, a raised state 1030, and a lowered state 1070. The moving states include a following state 1002, a rising state 1020, a rising back state 1040, a lowering state 1060, and a lowering back state 1080. The state machine 1000 operates similarly to the state machine 400 described in FIG. 4B. The features of the state machine 1000 that are the same as the features of the state machine 400 will not be repeated. The additional features of the state machine 1000 will be described below.

In one or more embodiments, when the system is in the rising state 1020, the system can transition to the rising back state 1040. The system transitions from the rising state 1020 to the rising back state 1040 when the sensing device is moving upwards (i.e., rising) and changes to lowering or moving downwards (i.e., rising back) without stopping for a predefined duration of time.

In one or more embodiments, when the system is in the rising back state 1040, the system can transition to the rising state 1020. The system transitions from the rising back state 1040 to the rising state 1020 when the sensing device is lowering or moving downwards (i.e., rising back) and changes to moving upwards (i.e., rising).

In various embodiments, the lowering state 1060 and the lowering back state 1080 operate similarly to the rising state 1020 and the rising back state 1040, respectively. The system can transition from the lowering state 1060 to the lowering back state 1080 when the sensing device is lowering or moving downwards (i.e., lowering) and changes to rising or moving upwards (i.e., lowering back) without stopping for a predefined duration of time.

Similarly, the system can transition from the lowering back state 1080 to the lowering state 1060 when the sensing device is rising or moving upwards (i.e., lowering back) and changes to lowering or moving downwards (i.e., lowering).

Figure 11:
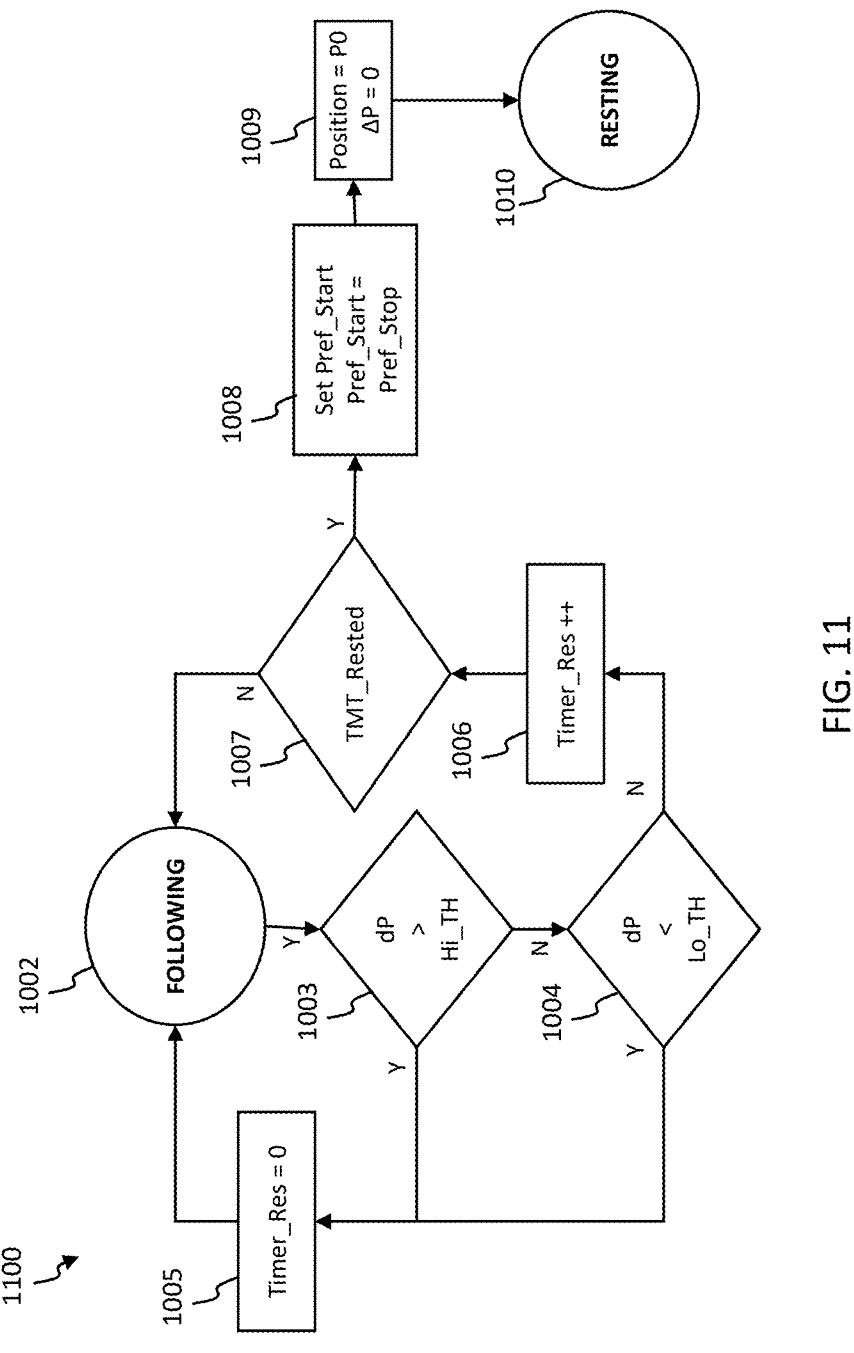
FIGS. 11-18 illustrates flow diagrams for transitions in a state machine transition according to an embodiment of the present application.

FIG. 11 illustrates a flow diagram for a state machine transition according to an embodiment of the present application. The flow diagram 1100 follows the steps of flow diagram 500 as described in FIG. 5. The flow diagram 1100 provides a view of the conditions to transition to the next state from the following state 1002 of state machine 1000. The steps of the flow diagram 1100 are the same as the steps of the flow diagram 500 and will not be repeated.

Figure 12:
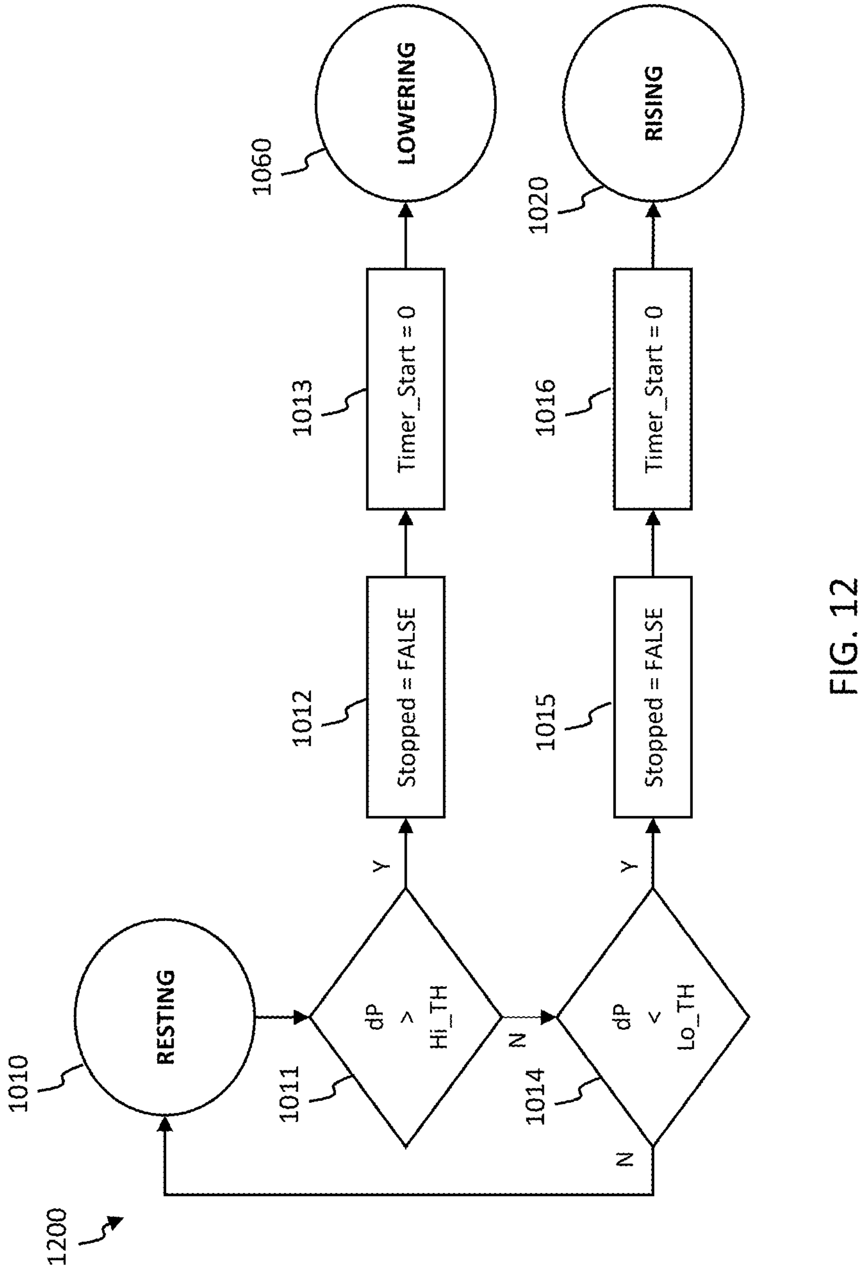

FIG. 12 illustrates a flow diagram for a state machine transition according to an embodiment of the present application. The flow diagram 1200 follows the steps of flow diagram 600 as described in FIG. 6. The flow diagram 1200 provides a view of the conditions to transition to the next state from the resting state 1010 of state machine 1000. The steps of the flow diagram 1200 are the same as the steps of the flow diagram 600 and will not be repeated.

Figure 13:
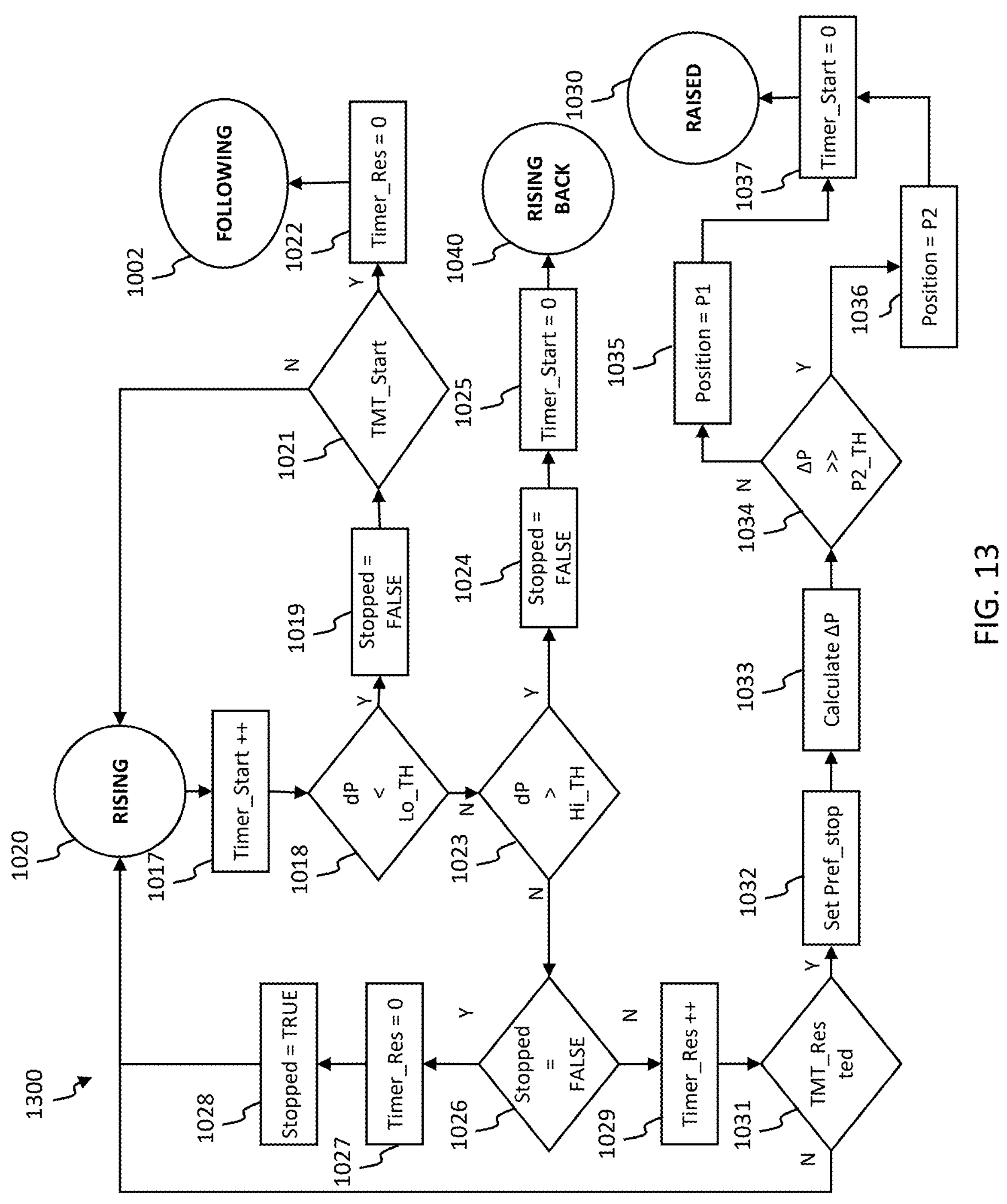

FIG. 13 illustrates a flow diagram for a state machine transition according to an embodiment of the present application. The flow diagram 1300 follows closely to the steps of flow diagram 700 as described in FIG. 7. The flow diagram 1300 provides a view of the conditions to transition to the next state from the rising state 1020 of state machine 1000. The steps of the flow diagram 1300 that are the same as the steps of the flow diagram 700 will not be repeated. The additional steps in flow diagram 1300 will be described below.

In the rising state 1020, the system checks whether the derivative pressure is greater than the high threshold (Hi_TH) 1023. When the derivative pressure is greater than the high threshold (1023=Y), the system proceeds to sets a "stopped" flag to false (Stopped=FALSE) 1024, set the rest timer to zero (Timer_Res=0) 1025, and transitions to the rising back state 1040. As described in FIG. 10, the rising state 1020 can transition to the rising back state 1040 when sensing device is moving upwards (i.e., rising) and changes to moving downwards (i.e., rising back) without stopping for a predefined duration of time. In one or more embodiments, the sensing device is moving downwards (i.e., rising back) when the derivative pressure is greater than the high threshold of the rising state 1020.

Figure 14:
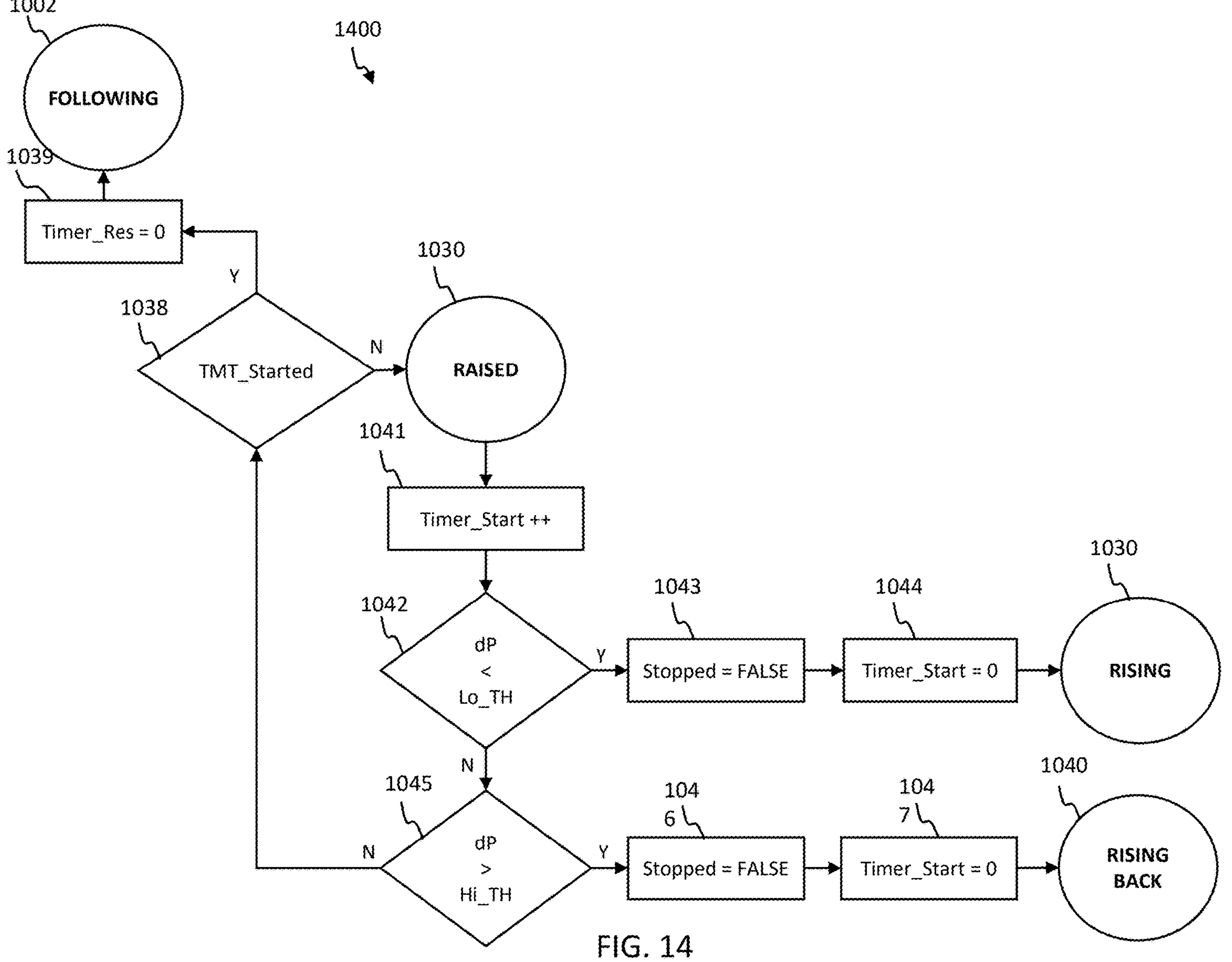

FIG. 14 illustrates a flow diagram for a state machine transition according to an embodiment of the present application. The flow diagram 1400 follows the steps of flow diagram 800 as described in FIG. 8. The flow diagram 800 provides a view of the conditions to transition to the next state from the raised state 1030 of state machine 1000. The steps of the flow diagram 1400 are the same as the steps of the flow diagram 800 and will not be repeated.

Figure 15:
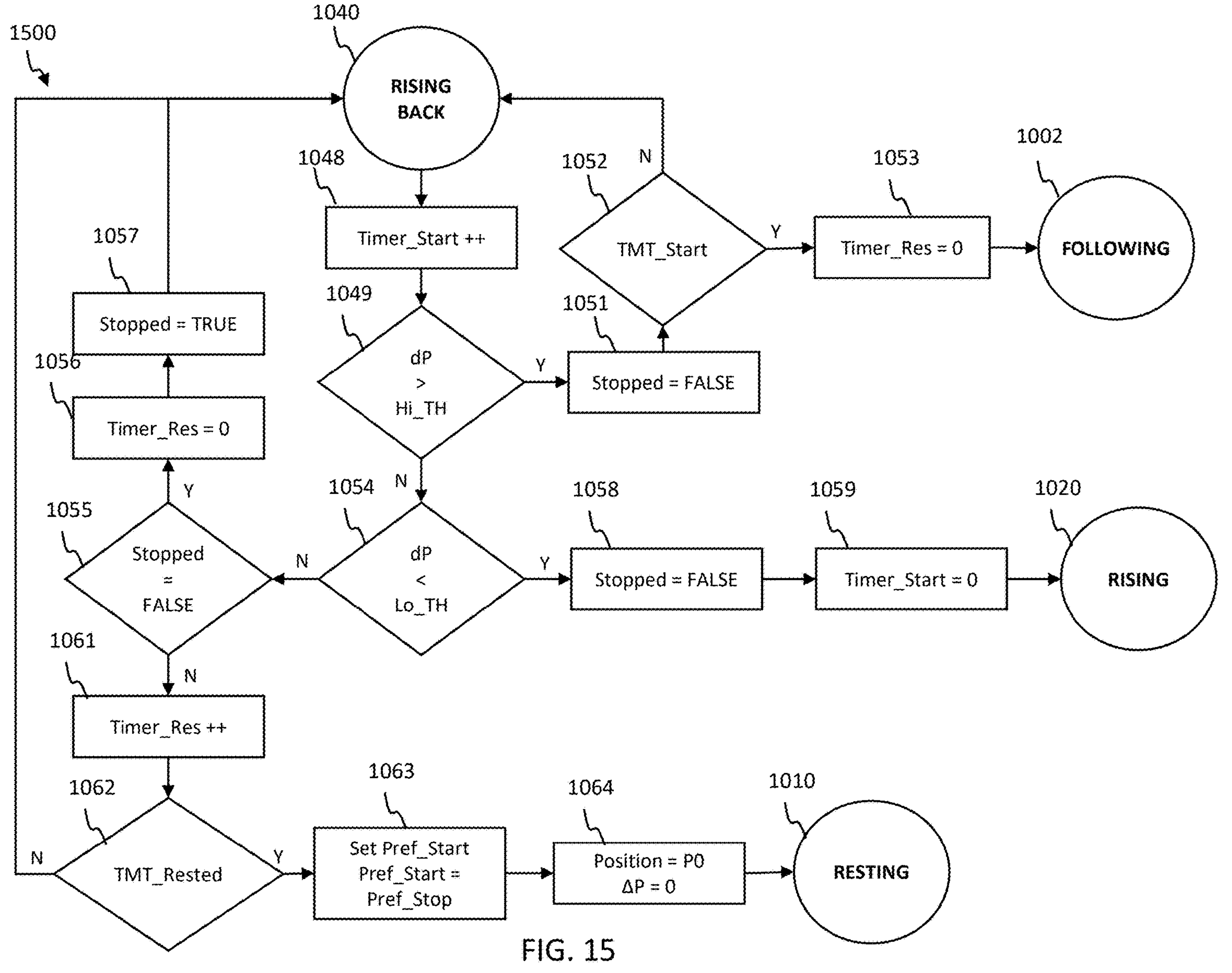

FIG. 15 illustrates a flow diagram for a state machine transition according to an embodiment of the present application. The flow diagram 1500 follows closely to the flow diagram 900 as described in FIG. 9. The flow diagram 1500 provides a view of the conditions to transition to the next state from the rising back state 1040 of state machine 1000. The steps of the flow diagram 1500 that are the same as the steps of the flow diagram 900 will not be repeated. The additional steps in flow diagram 1500 will be described below.

In the rising back state 1040, the system checks whether the derivative pressure is less than the low threshold (Lo_TH) 1054. When the derivative pressure is less than the low threshold (1054=Y), the system proceeds to set a "stopped" flag to false 1058, set the rest timer to zero 1059, and transition to the rising state 1020. As described in FIG. 10, the rising back state 1040 can transition to the rising state 1020 when the sensing device is moving downwards (i.e., rising back) and changes to moving upwards (i.e., rising) without stopping for a predefined duration of time. In one or more embodiments, the sensing device is moving upwards (i.e., rising) when the derivative pressure is less than the low threshold of the rising back state 1040.

Figure 16:
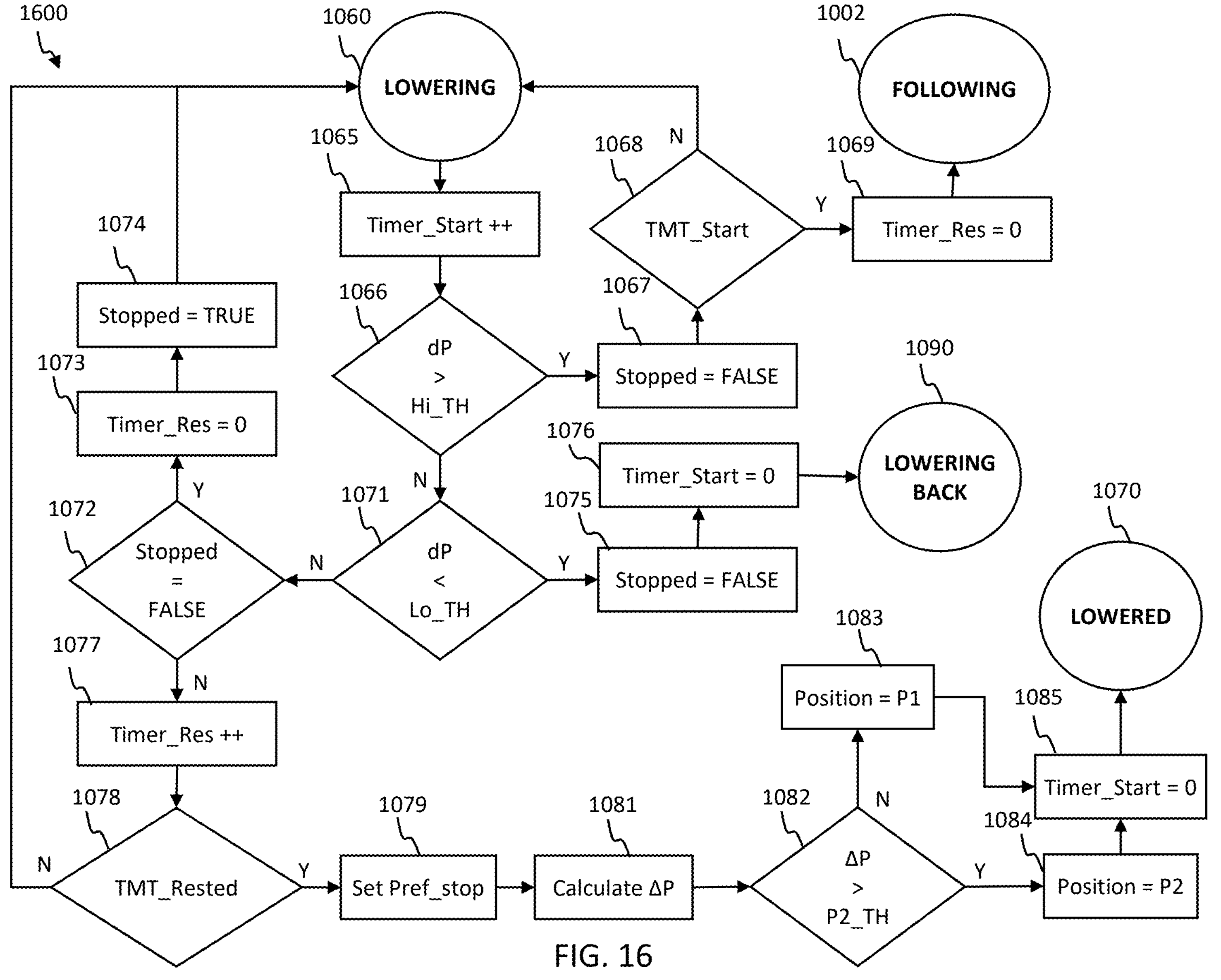

FIG. 16 illustrates a flow diagram for a state machine transition according to an embodiment of the present application. The flow diagram 1600 follows closely to the steps of flow diagram 700 in FIG. 7 and flow diagram 1300 of FIG. 13. The flow diagram 1300 provides a view of the conditions to transition to the next state from the lowering state 1060 of state machine 1000. The steps of the flow diagram 1600 that are the same as the steps of the flow diagrams 700 and 1300 will not be repeated. The additional steps in flow diagram 1600 will be described below.

In one or more embodiments, the lowering state 1060 is a state that represents a downward motion from the resting state 420 of the state machine 1000. From the lowering state 1060, the system evaluates pressure changes by comparing a derivative pressure data (dP) with a high threshold (Hi_TH) of the lowering state 1060 and a low threshold (Lo_TH) of the lowering state 1060. The threshold of the lowering state 1060 can be used to determine when the sensing device is steady or moving upward or downward. For example, when the derivative pressure data (dP) is less than the low threshold of the lowering state 1060, the sensing device may be moving upward. When the derivative pressure data is greater than the high threshold of the lowering state 1060, the sensing device may be continuing to move in a downwards motion or the sensing device may be approaching a lowered state 1070 when the movement stops for a predefined duration of time.

The system checks whether the derivative pressure data (dP) is greater than a high threshold (Hi_TH) 1066 of the lowering state 1060. When the derivative pressure data is greater than the high threshold (1066=Y) of the lowering state 1060 and the start timer 1065 does not reach the start timeout value (TMT_Start) (1068=N), the system returns to the lowering state 1060. When the start timer 1065 reaches the start timeout value (1068=Y), the system returns to the following state 1002.

When the derivative pressure is less than the high threshold (1066=N), the system checks whether the derivative pressure is less than the low threshold (Lo_TH) 1071. When the derivative pressure is less than the low threshold (1071=Y), the system proceeds transition to the lowering back state 1090. In various embodiments, the system may return to the following state when the derivative pressure is less than the low threshold.

When the derivative pressure is greater than the low threshold (1071=N), the system determines that the stopped flag is not false (1072=N) and proceeds to the lowered state 1070. The steps that are in between determining whether the stopped flag is false 1072 and entering the lowered state 1070 follow the steps of flow diagram 700 between determining whether the stopped flag is false 447 and entering the raised state 460.

Figure 17:
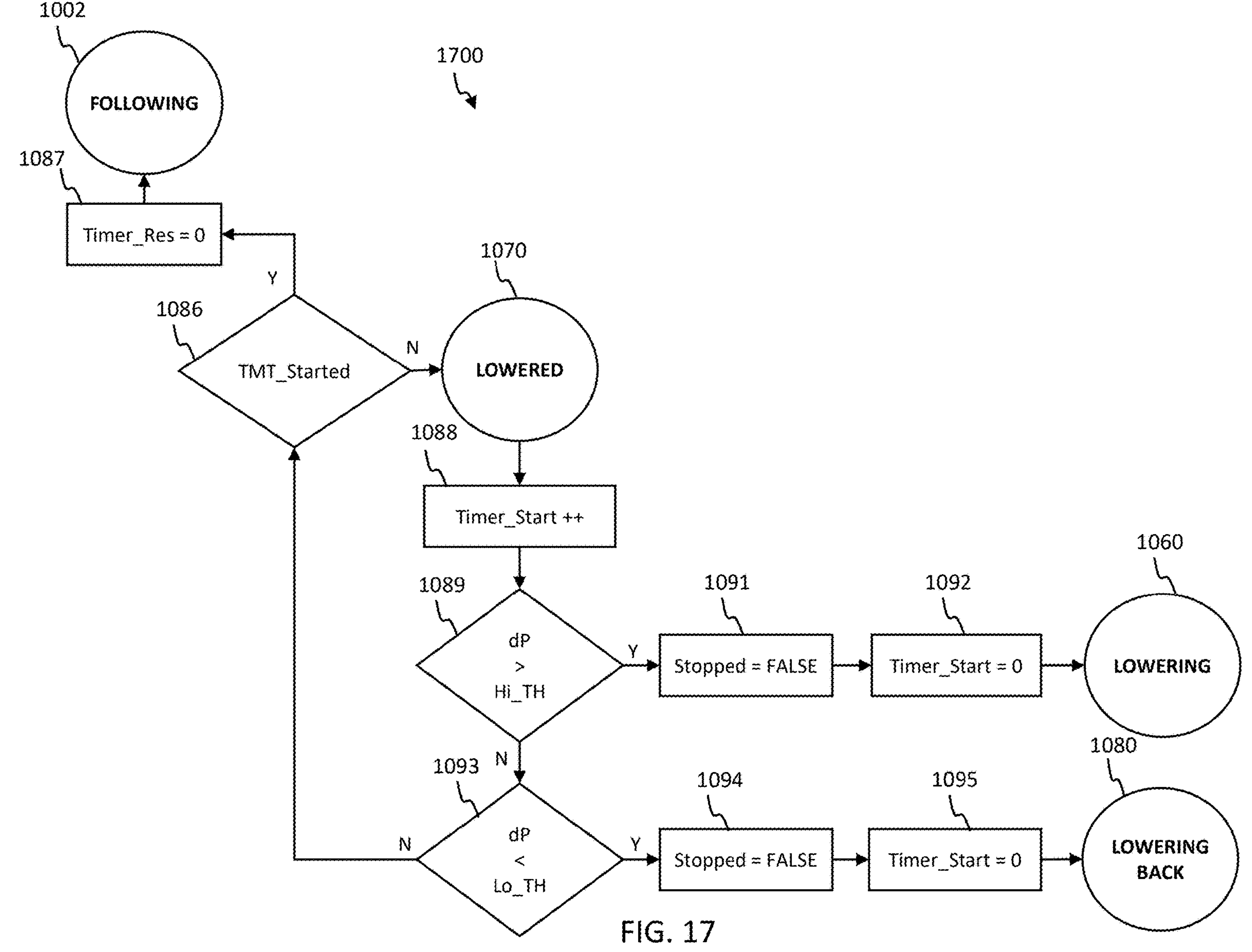

FIG. 17 illustrates a flow diagram for a state machine transition according to an embodiment of the present application. The flow diagram 1700 follows the steps of flow diagram 800 in FIG. 8 and flow diagram 1400 in FIG. 14. The flow diagram 1700 provides a view of the conditions to transition to the next state from the lowered state 1070 of state machine 1000. The steps of the flow diagram 1700 that are the same as the steps of the flow diagram 800 will not be repeated.

In one and embodiments, the lowered state 1070 is a state that represents a stable lowered position relative to a reference position after a downward motion stops. From the lowered state 1070, the system evaluates pressure changes by comparing a derivative pressure data (dP) with a high threshold (Hi_TH) of the lowered state 1070 and a low threshold (Lo_TH) of the lowered state 1070. The threshold of the lowered state 1070 can be used to determine when the sensing device is moving upward or downward from the lowered position. For example, when the derivative pressure data (dP) is greater than the high threshold of the lowered state 1070, the sensing device is moving downwards (i.e., lowering). When the derivative pressure data is less than the low threshold of the lowered state 1070, the sensing device is moving upwards (i.e., lowering back).

In various embodiments, when the derivative pressure data is less than the high threshold and greater than the low threshold, the sensing device may be in a stable lowered position for a predefined duration of time. If the sensing device is in the stable lowered position for more than the predefined duration of time, the system may return to the following state 1002 to determine a new reference position (P0).

When the system is in the lowered state 1070, the system determines whether the derivative pressure data (dP) is greater than a high threshold (Hi_TH) 1089 of the lowered state 1070. When the derivative pressure data is greater than the high threshold (1089=Y) of the lowered state 1070, the system proceeds to the lowering state 1060.

When the derivative pressure data is less than the high threshold (1089=N) of the lowered state 1070, the system proceeds to determine whether the derivative pressure data (dP) is less than a low threshold (Lo_TH) 1093 of the lowered state 1070. When the derivative pressure data is less than the low threshold (1093=Y) of the lowered state 1070, the system proceeds to enter the lowering back state 1080.

When the derivative pressure data is greater than the low threshold (1093=N) of the lowered state 1070, the system determines whether the start timer 1088 reaches a started timeout value (TMT_Started) 1086. If the start timer 1088 does not reach the started timeout value (1086=N), the system returns to the lowered state 1070 to continue evaluating the derivative pressure data compared to the thresholds. If the start timer 1088 reaches the started timeout value (1086=Y), the system returns to the following state 1002.

Figure 18:
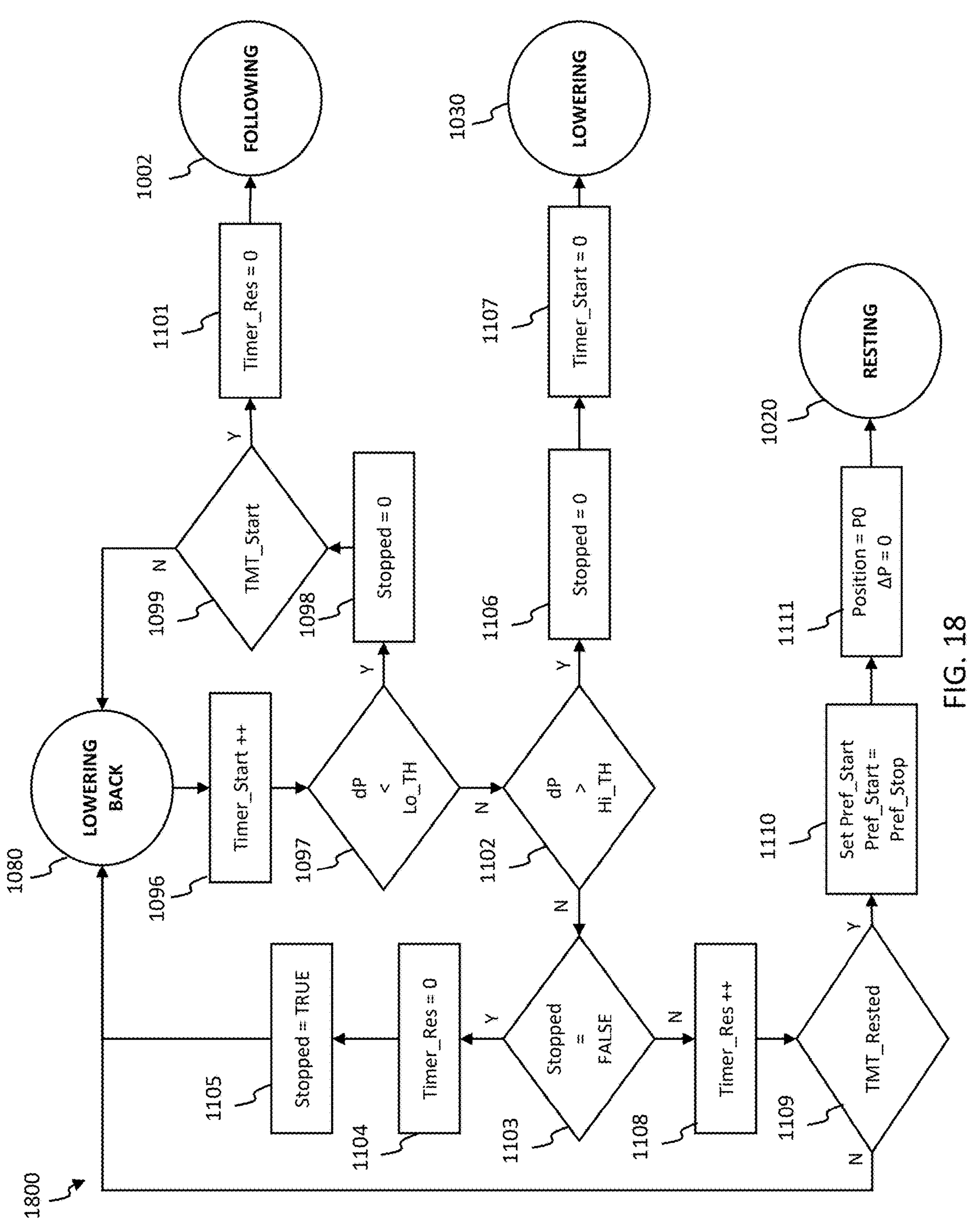

FIG. 18 illustrates a flow diagram for a state machine transition according to an embodiment of the present application. The flow diagram 1800 follows closely to the flow diagram 900 in FIG. 9 and flow diagram 1500 in FIG. 15. The flow diagram 1800 provides a view of the conditions to transition to the next state from the lowering back state 1080 of state machine 1000. The steps of the flow diagram 1800 that are the same as the steps of the flow diagrams 900 and 1500 will not be repeated. The additional steps in flow diagram 1800 will be described below.

In one or more embodiments, the lowering back state 1080 is a state that represents an upward motion from the lowered state 1070 of the state machine 400. From lowering back state 1080, the system continuously evaluates pressure by comparing a derivative pressure data (dP) with a high threshold (Hi_TH) of the lowering back state 1080 and a low threshold (Lo_TH) of the lowering back state 1080.

When the system is in the lowering back state 1080, the system checks whether the derivative pressure data (dP) is less than a low threshold (Lo_TH) 1097 of the lowering back state 1080. When the derivative pressure data is less than the low threshold (1097=Y) of the lowering back state 1080, the system determines whether the start timer 1096 reaches a start timeout value (TMT_Start) 1099. If the start timer does not reach the start timeout value (1099=N), the system returns to the lowering back state 1080. If the start timer reaches the timeout value (1099=Y), the system proceeds to enter the following state 402.

When the derivative pressure data is greater than the low threshold (1097=N) of the lowering back state 1080, the system proceeds to determine whether the derivative pressure data (dP) is greater than a high threshold (Hi_TH) 1102 of the lowering back state 1080. When the derivative pressure data is less than the high threshold (1102=N) of the lowering back state 1080, the system enters the resting state 1020 or returns to the lowering back state 1080. When the derivative pressure is greater than the high threshold (1102=Y), the system proceeds to enter the lowering state 1030.

Figure 19A:
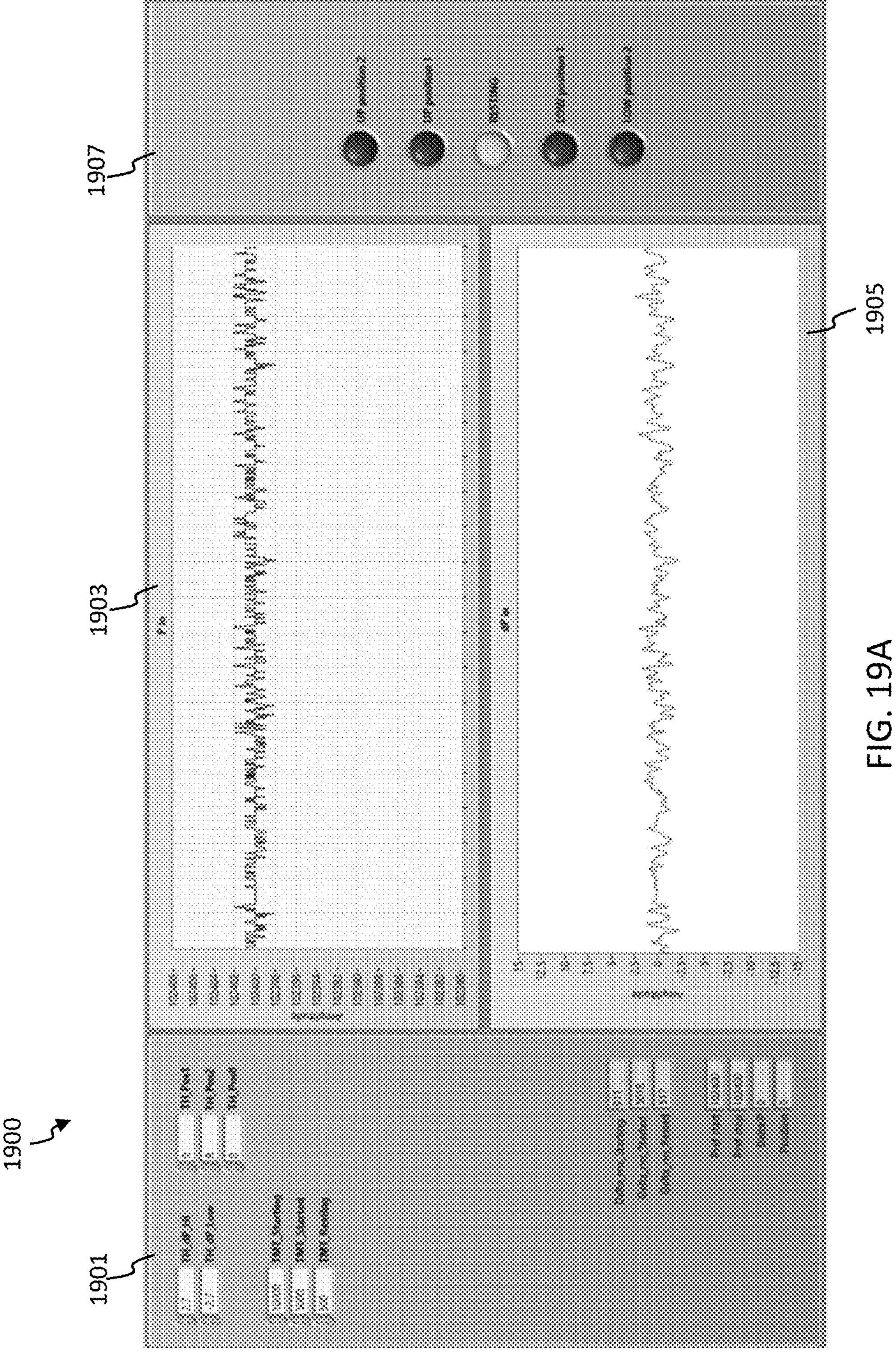
FIGS. 19A-19E illustrate graphs providing outputs for a sensing device according to an embodiment of the present application.
Figure 19B:
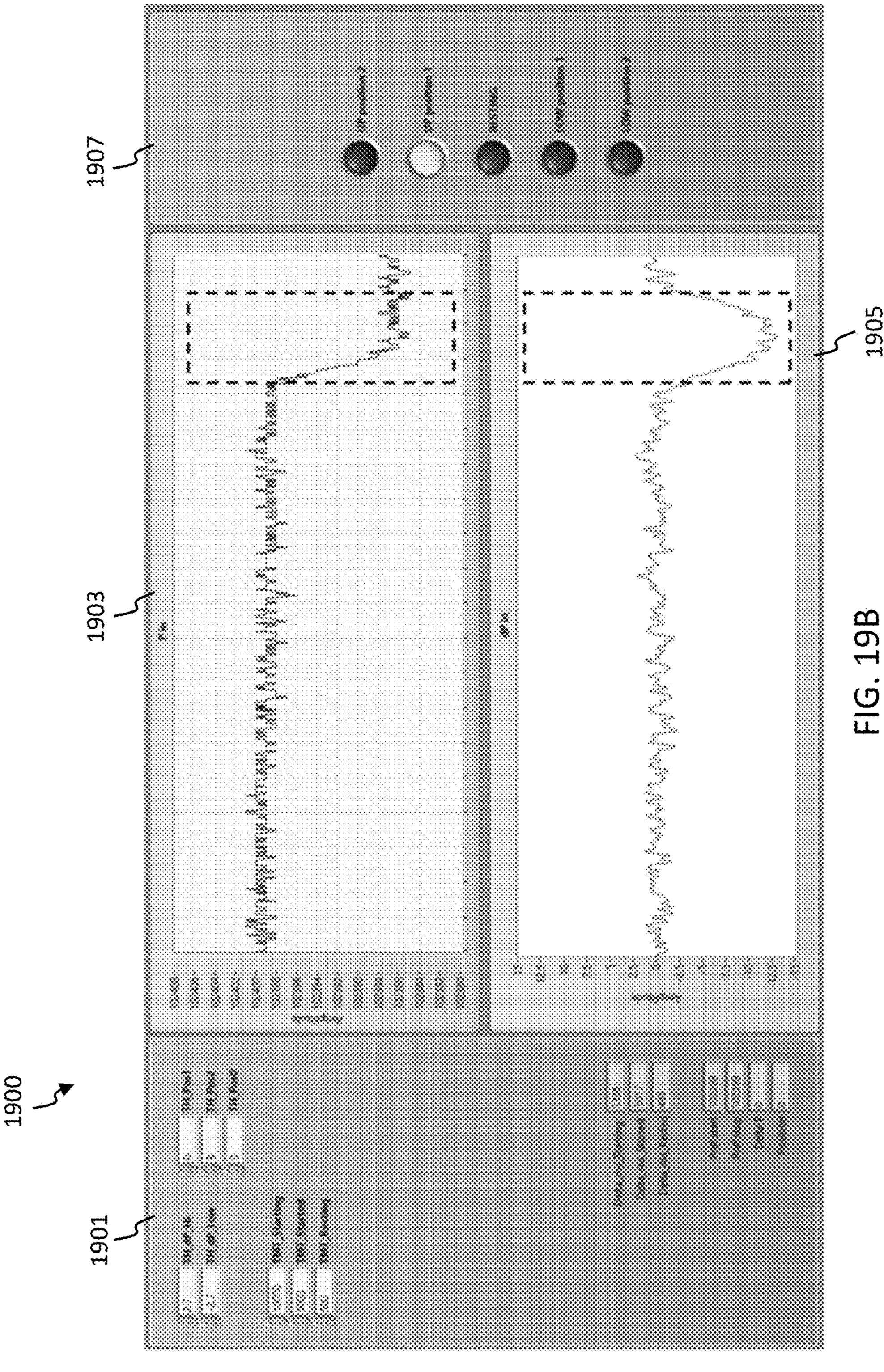
Figure 19C:
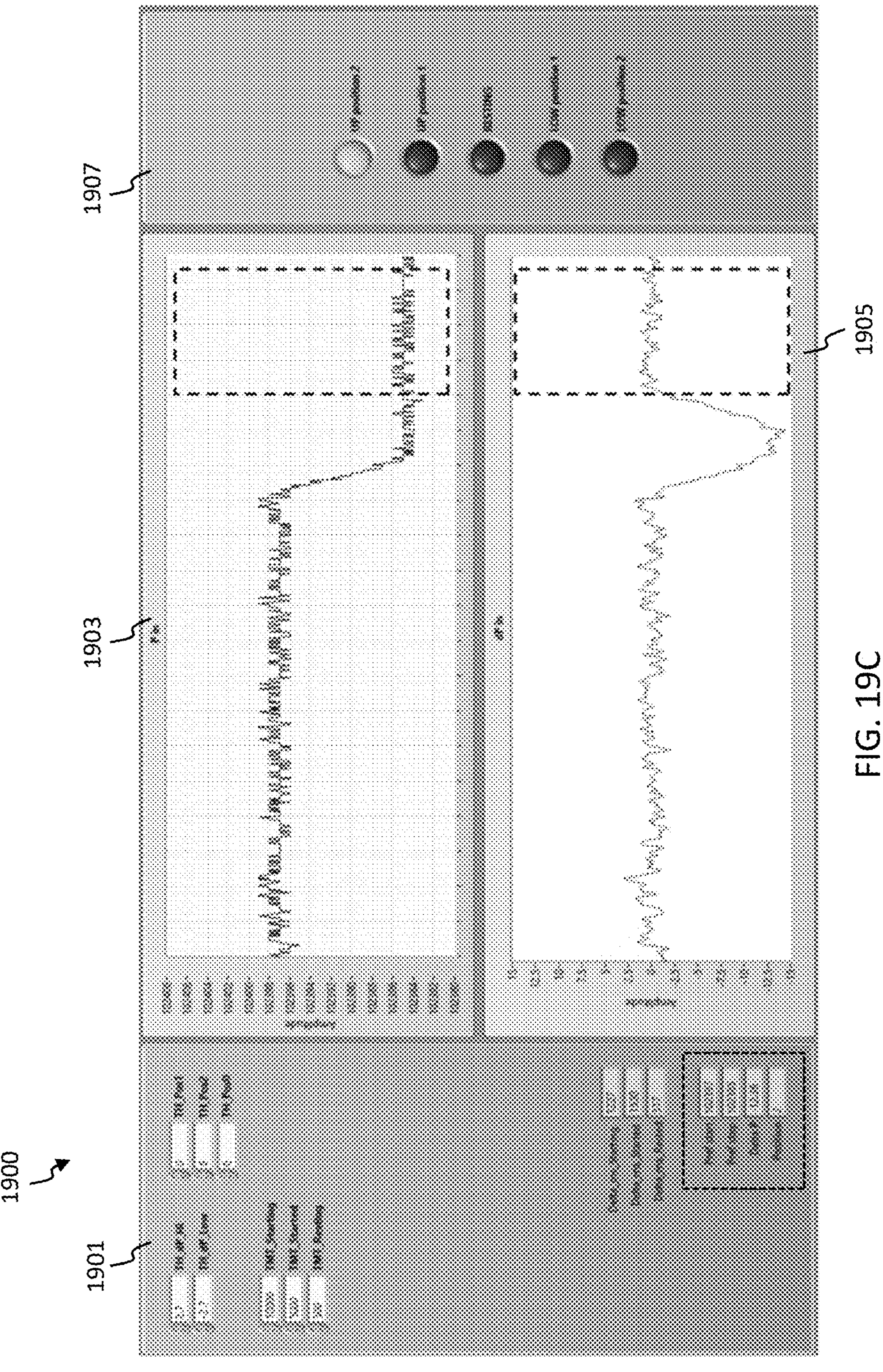
Figure 19D:
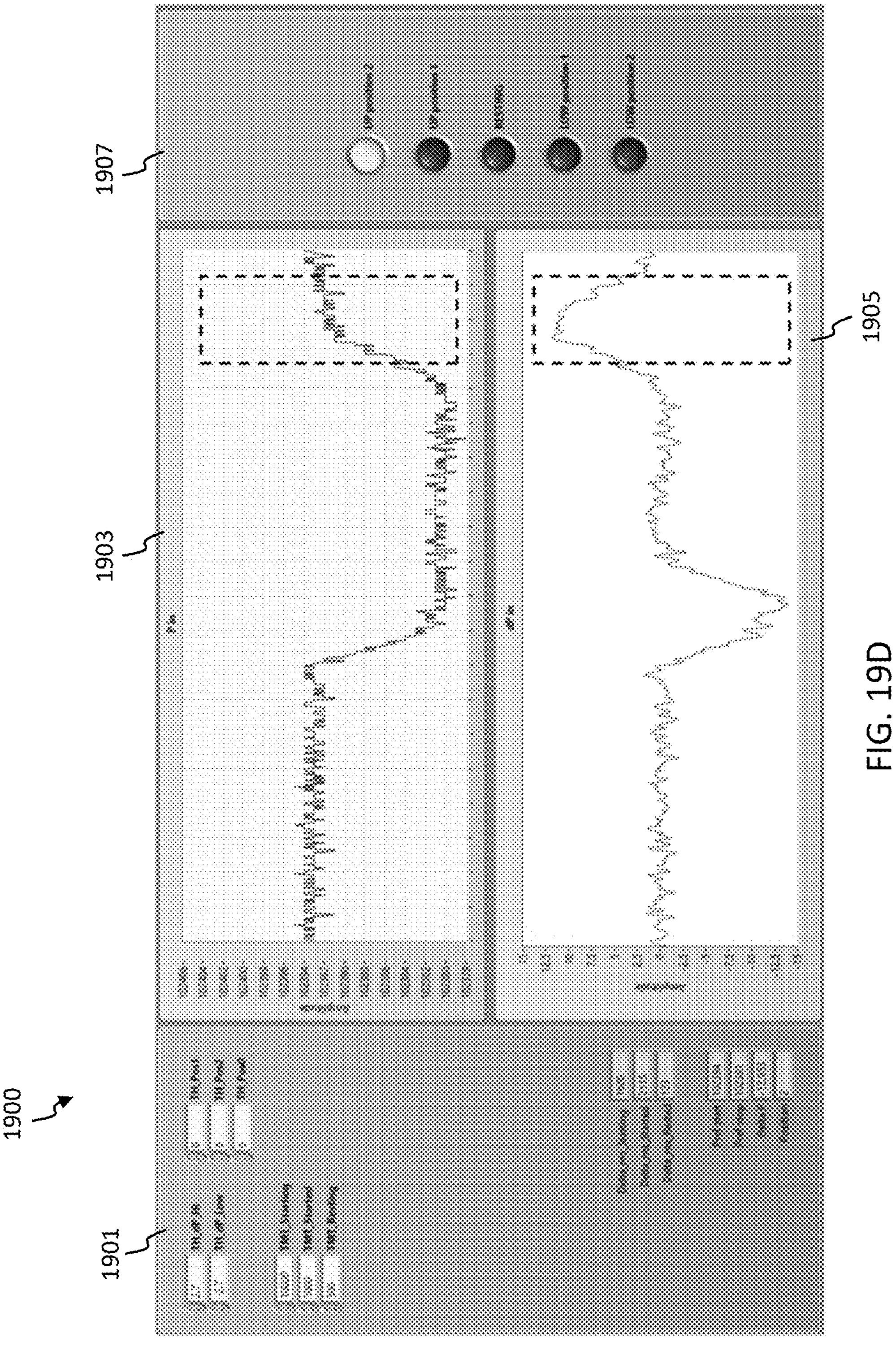
Figure 19E:
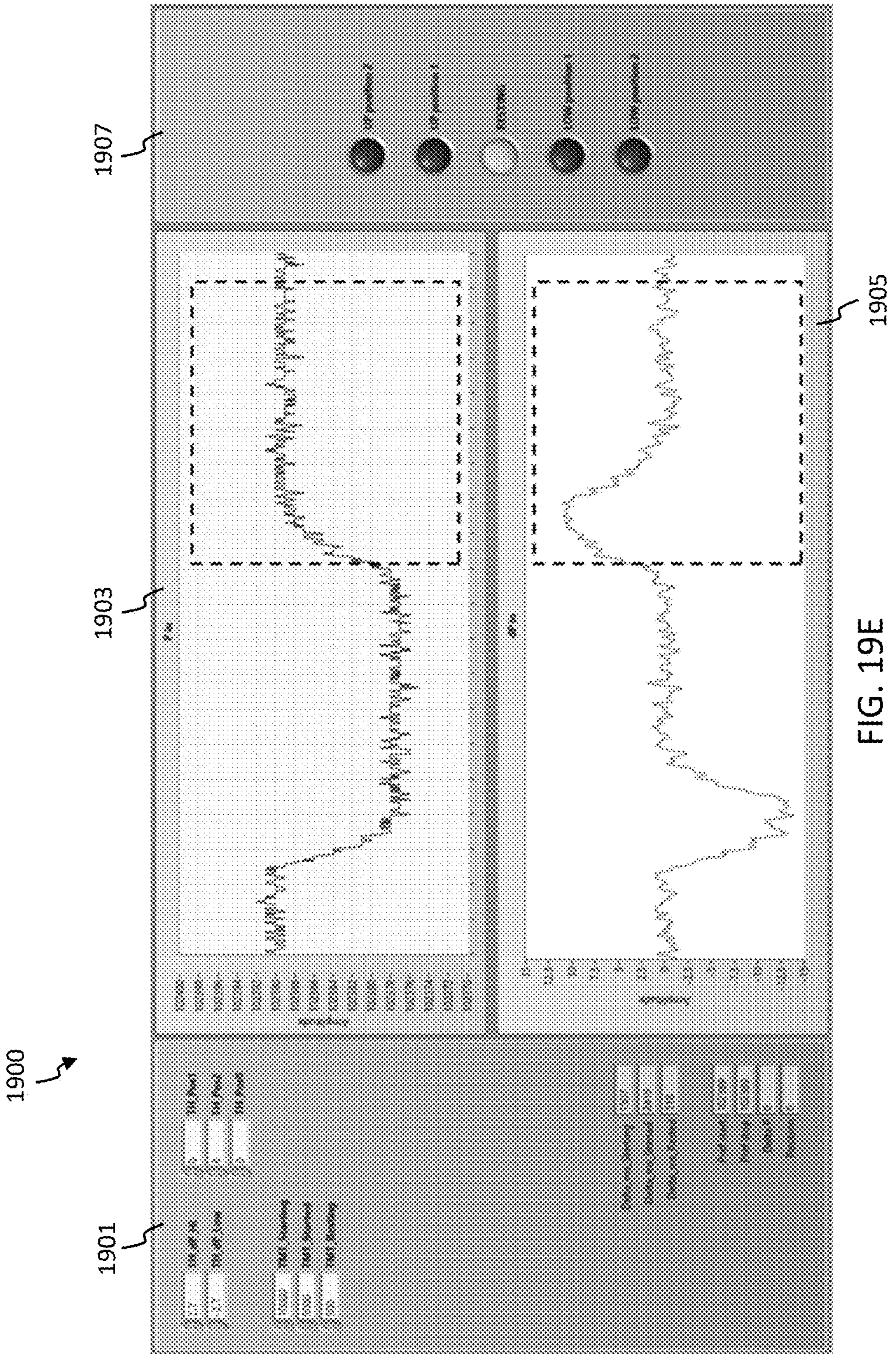

FIGS. 19A-19E illustrate the output for a sensing device according to an embodiment of the present application, where FIG. 19A shows an output of the sensing device in a resting state, FIG. 19B shows an output of the sensing device in a rising state, FIG. 19C shows an output of the sensing device in a raised state, FIG. 19D shows an output of the sensing device in a rising back state, and FIG. 19E shows an output of the sensing device in a resting state. The pressure output 1900 includes an input/output view 1901, a raw pressure graph 1903, a derivative pressure graph 1905, and a position view 1907.

In one or more embodiments, the input/output view 1901 shows configurable inputs for a high threshold (TH_dP_Hi or Hi_TH), a low threshold (TH_dP_Lo or LO_TH), threshold positions (TH_Pos1, TH_Pos2, TH_Pos0), and timeout settings (TMT_Starting, TMT_Started, TMT_Resting). The timeout settings include a start timeout (TMT_Starting) that can be set as a time threshold to determine when the detected motion remains in the same state or transitions to the following state (e.g., TMT_Start 445, 485, 1021, 1052, 1068, 1099), a started timeout (TMT_Started) that can be set to as a time threshold to determine when a new resting position is detected (e.g., TMT_Started 468, 1038, 1086), and a rest timeout (TMT_Resting) that can be set as a time threshold to determine when pressure data is stable (e.g., TMT_Rested 412, 452, 492, 1007, 1031, 1062, 1078, 1109). In one or more embodiments, the input/output view 1901 shows outputs for a starting timer (Delta_ms_Starting), a started timer (Delta_ms_Started), a rested timer (Delta_ms_Rested), a starting reference pressure (Pref_start), a stopping reference pressure (Pref_stop), a change in pressure (Delta P), and a position output.

In one or more embodiments, the raw pressure graph Pin 1903 shows the amplitude of the raw pressure data over time and the derivative pressure dPin graph 1905 shows the rate of change of the pressure data. The position view 1907 shows the current position of the sensing device. In one or more embodiments, the derivative pressure graph 1905 shows a greater rate of change as the raw pressure data changes from low to high or high to low over time, and the derivative pressure graph 1905 stabilizes when the raw pressure data is stable over a duration of time.

Example embodiments of the present invention are summarized here. Other embodiments can also be understood from the entirety of the specification and the claims filed herein. It is understood that various embodiments described herein can be combined.

Example 1. A first example comprises a method that includes providing a barometric signal via a barometric sensor; processing the barometric signal with a state machine having a plurality of states, the plurality of states include stationary states and moving states; transitioning from a first state of the plurality of states of the state machine to a second state of the plurality of states of the state machine as a function of the barometric signal reaching a signal threshold and as a function of a time reaching a time threshold; and determining a movement of the barometric sensor based on the transition from the first state to the second state.

Example 2. The method of example 1, further includes denoising the barometric signal before processing the barometric signal.

Example 3. The method of examples 1 or 2, further includes determining that the second state has been reached based on state data and changes in the barometric signal from the state machine, and determining a height and a direction of the movement based on the state data and the changes in the barometric signal.

Example 4. The method of examples 1 to 3, further includes mapping the height and the direction of the movement to perform gesture recognition on a user interface.

Example 5. The method of examples 1 to 4, where the stationary states include a resting state, a raised state, and a lowered state, and where the moving states include a following state, a rising state, a rising back state, a lowering state, and a lowering back state.

Example 6. The method of examples 1 to 5, where the resting state is a first position, the raised state is a second position higher than the first position, and the lowered state is a third position lower than the first position.

Example 7. The method of examples 1 to 6, where the rising state is an upward motion between the first position and the second position, the rising back state is a downward motion between the first position and the second position, the lowering state is a downward motion between the first position and the third position, and the lowering back state is an upward motion between the first position and the third position.

Example 8. A second example includes a sensing device. The sensing device includes a barometric sensor and a processing unit coupled to the barometric sensor. The processing unit configured as a state machine to receive a barometric signal from the barometric sensor; process the barometric signal with the state machine having a plurality of states, the plurality of states including stationary states and moving states; transition from a first state of the plurality of states of the state machine to a second state of the plurality of states of the state machine as a function of the barometric signal reaching a signal threshold and as a function of a time reaching a time threshold; determine a height and a direction of movement of the barometric sensor in response to transitioning from the first state to the second state; and map the height and the direction of movement to perform gesture recognition on a user interface.

Example 9. The sensing device of example 8, where the processing unit is further configured to determine that the second state has been reached based on state data and change in the barometric signal from the state machine.

Example 10. The sensing device of examples 8 or 9, where the processing unit is further configured to generate a denoised barometric signal from the barometric signal received from the barometric sensor before processing the barometric signal with the state machine.

Example 11. The sensing device of examples 8 to 10, where the stationary states include a resting state, a raised state, and a lowered state, and where the moving states include a following state, a rising state, a rising back state, a lowering state, and a lowering back state.

Example 12. The sensing device of examples 8 to 11, where the resting state is a first position, the raised state is a second position higher than the first position, and the lowered state is a third position lower than the first position.

Example 13. The sensing device of examples 8 to 12, where the rising state is an upward motion between the first position and the second position, the rising back state is a downward motion between the first position and the second position, the lowering state is a downward motion between the first position and the third position, and the lowering back state is an upward motion between the first position and the third position.

Example 14. A third example comprises a method that includes receiving a state machine activation signal; in response to the receiving the state machine activation signal, detecting a change in a barometric signal via a barometric sensor; in response to detecting the change in the barometric signal, entering a first state; determining that a magnitude of the change in the barometric signal is less than a high threshold of a first state; in response to determining that the magnitude of the change in the barometric signal is less than the high threshold of the first state, determining that the magnitude of the change in the barometric signal is greater than a low threshold of the first state; and in response to determining that the magnitude of the change in the barometric signal is greater than the low threshold of the first state, determining an initial height for a second state.

Example 15. The method of example 14, further includes determining that the magnitude of the change in the signal is less than a high threshold of the second state while in the second state; and in response to determining the magnitude of the change in the barometric signal is less than the high threshold of the second state, determining that the magnitude of the change in the barometric signal is less than a low threshold of the second state; in response to determining that the magnitude of the change in the barometric signal is less than the low threshold of the second state, entering a third state; and in response to entering the third state, determining an increase in height from the initial height.

Example 16. The method of examples 14 or 15, further includes determining that the magnitude of the change in the barometric signal is greater than a low threshold of the third state while in the third state; in response to the magnitude of the change in the barometric signal being greater than the low threshold of the third state, determining whether the magnitude of the change in the barometric signal is less than a high threshold of the third state; in response to the magnitude of the change in the barometric signal being less than the high threshold of the third state, calculating a change in height based on a current height and the initial height in the second state; and determining a raised height for a fourth state based on the change in height.

Example 17. The method of examples 13 to 16, further includes in response to the magnitude of the change in the barometric signal being greater than the high threshold of the third state while in the third state, entering the first state or a fifth state; and in response to entering the fifth state, detecting a downward motion between the raised height and the initial height.

Example 18. The method of examples 13 to 17, further includes determining that the magnitude of the change in the barometric signal is greater than a high threshold of the second state while in the second state; in response to determining the magnitude of the change in the barometric signal being greater than the high threshold of the second state, entering a sixth state; and in response to entering the sixth state, determining a decrease in height from the initial height.

Example 19 The method of examples 13 to 18, further includes determining that the magnitude of the change in the barometric signal is less than a high threshold of the sixth state while in the sixth state; in response to the magnitude of the change in the barometric signal being less than the high threshold of the sixth state, determining whether the magnitude of the change in the barometric signal is greater than a low threshold of the sixth state; and in response to the magnitude of the change in the barometric signal being greater than the low threshold of the sixth state, calculating a change in height based on a current height and the initial height in the second state; and determining a lowered height for a seventh state based on the change in height.

Example 20. The method of examples 13 to 19, further includes in response to the magnitude of the change in the barometric signal being less than the low threshold of the sixth state while in the sixth state, entering the first state or an eighth state; and in response to entering the eighth state, detecting an upward motion between the lowered height and the initial height.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:

providing a barometric signal via a barometric sensor;

processing the barometric signal with a state machine having a plurality of states, the plurality of states comprising stationary states and moving states;

transitioning from a first state of the plurality of states of the state machine to a second state of the plurality of states of the state machine as a function of the barometric signal reaching a signal threshold and as a function of a time reaching a time threshold;

determining a movement of the barometric sensor based on the transition from the first state to the second state;

determining a height of the barometric sensor based on the movement of the barometric sensor; and performing gesture recognition by controlling inputs on a user interface corresponding to the movement and the height of the barometric sensor.

2. The method of claim 1, further comprising denoising the barometric signal before processing the barometric signal.

3. The method of claim 1, further comprising:

determining that the second state has been reached based on state data and a change in the barometric signal from the state machine; and determining a change in the height of the barometric sensor and a direction of the movement of the barometric sensor based on the state data and the change in the barometric signal.

4. The method of claim 3, wherein controlling the inputs on the user interface further comprises mapping the change in the height of the barometric sensor and the direction of the movement of the barometric sensor to perform gesture recognition on the user interface.

5. The method of claim 1, wherein the stationary states comprise a resting state, a raised state, and a lowered state, and wherein the moving states comprise a following state, a rising state, a rising back state, a lowering state, and a lowering back state.

6. The method of claim 5, wherein the resting state is a first position, the raised state is a second position higher than the first position, and the lowered state is a third position lower than the first position.

7. The method of claim 6, wherein:

the rising state is an upward motion between the first position and the second position;

the rising back state is a downward motion between the first position and the second position;

the lowering state is a downward motion between the first position and the third position; and the lowering back state is an upward motion between the first position and the third position.

8. A sensing device comprising:

a barometric sensor; and a processing unit coupled to the barometric sensor, the processing unit configured as a state machine to:

receive a barometric signal from the barometric sensor;

process the barometric signal with the state machine having a plurality of states, the plurality of states comprising stationary states and moving states;

transition from a first state of the plurality of states of the state machine to a second state of the plurality of states of the state machine as a function of the barometric signal reaching a signal threshold and as a function of a time reaching a time threshold;

determine a height and a direction of movement of the barometric sensor in response to transitioning from the first state to the second state; and map the height and the direction of the movement to perform gesture recognition on a user interface.

9. The sensing device of claim 8, wherein the processing unit is further configured to determine that the second state has been reached based on state data and a change in the barometric signal from the state machine.

10. The sensing device of claim 8, wherein the processing unit is further configured to generate a denoised barometric signal from the barometric signal received from the barometric sensor before processing the barometric signal with the state machine.

11. The sensing device of claim 8, wherein the stationary states comprise a resting state, a raised state, and a lowered state, and wherein the moving states comprise a following state, a rising state, a rising back state, a lowering state, and a lowering back state.

12. The sensing device of claim 11, wherein the resting state is a first position, the raised state is a second position higher than the first position, and the lowered state is a third position lower than the first position.

13. The sensing device of claim 12, wherein:

the rising state is an upward motion between the first position and the second position;

the rising back state is a downward motion between the first position and the second position;

the lowering state is a downward motion between the first position and the third position; and the lowering back state is an upward motion between the first position and the third position.

14. A method comprising:

receiving a barometric signal via a barometric sensor;

processing the barometric signal with a state machine having a plurality of states; and performing gesture recognition by controlling inputs on a user interface based on the barometric signal and a current state in the state machine, wherein processing the barometric signal with the state machine comprises:

receiving a state machine activation signal;

in response to receiving the state machine activation signal, detecting a change in the barometric signal via the barometric sensor;

in response to detecting the change in the barometric signal, entering a first state;

determining that a magnitude of the change in the barometric signal is less than a high threshold of the first state;

in response to determining that the magnitude of the change in the barometric signal is less than the high threshold of the first state, determining that the magnitude of the change in the barometric signal is greater than a low threshold of the first state; and in response to determining that the magnitude of the change in the barometric signal is greater than the low threshold of the first state, determining an initial height for a second state.

15. The method of claim 14, further comprising:

determining that the magnitude of the change in the barometric signal is less than a high threshold of the second state while in the second state;

in response to determining that the magnitude of the change in the barometric signal is less than the high threshold of the second state, determining that the magnitude of the change in the barometric signal is less than a low threshold of the second state;

in response to determining that the magnitude of the change in the barometric signal is less than the low threshold of the second state, entering a third state; and in response to entering the third state, determining an increase in height from the initial height.

16. The method of claim 15, further comprising:

determining that the magnitude of the change in the barometric signal is greater than a low threshold of the third state while in the third state;

in response to determining that the magnitude of the change in the barometric signal is greater than the low threshold of the third state, determining whether the magnitude of the change in the barometric signal is less than a high threshold of the third state;

in response to determining that the magnitude of the change in the barometric signal is less than the high threshold of the third state, calculating a change in height based on a current height and the initial height in the second state; and determining a raised height for a fourth state based on the change in height.

17. The method of claim 16, further comprising:

in response to determining that the magnitude of the change in the barometric signal is greater than the high threshold of the third state while in the third state, entering the first state or a fifth state; and in response to entering the fifth state, detecting a downward motion between the raised height and the initial height.

18. The method of claim 14, further comprising:

determining that the magnitude of the change in the barometric signal is greater than a high threshold of the second state while in the second state;

in response to determining that the magnitude of the change in the barometric signal is greater than the high threshold of the second state, entering a sixth state; and in response to entering the sixth state, determining a decrease in height from the initial height.

19. The method of claim 18, further comprising:

determining that the magnitude of the change in the barometric signal is less than a high threshold of the sixth state while in the sixth state;

in response to determining that the magnitude of the change in the barometric signal is less than the high threshold of the sixth state, determining whether the magnitude of the change in the barometric signal is greater than a low threshold of the sixth state;

in response to determining that the magnitude of the change in the barometric signal is greater than the low threshold of the sixth state, calculating a change in height based on a current height and the initial height in the second state; and determining a lowered height for a seventh state based on the change in height.

20. The method of claim 19, further comprising:

in response to determining that the magnitude of the change in the barometric signal is less than the low threshold of the sixth state while in the sixth state, entering the first state or an eighth state; and in response to entering the eighth state, detecting an upward motion between the lowered height and the initial height.

* * * * *